(12) United States Patent
Hirose

(10) Patent No.: US 7,266,443 B2
(45) Date of Patent: Sep. 4, 2007

(54) INFORMATION PROCESSING DEVICE, SYSTEM THEREOF, METHOD THEREOF, PROGRAM THEREOF AND RECORDING MEDIUM STORING SUCH PROGRAM

(75) Inventor: Koji Hirose, Tokyo (JP)

(73) Assignees: Pioneer Corporation, Tokyo (JP); Increment P. Corporation, Tokyo (JP)

( * ) Notice: Subject to any disclaimer, the term of this patent is extended or adjusted under 35 U.S.C. 154(b) by 333 days.

(21) Appl. No.: 10/710,425

(22) Filed: Jul. 9, 2004

(65) Prior Publication Data

US 2005/0027434 A1 Feb. 3, 2005

(30) Foreign Application Priority Data

Jul. 30, 2003 (JP) .............................. 2003-203979

(51) Int. Cl.
*G08G 1/00* (2006.01)
*G01C 21/00* (2006.01)

(52) U.S. Cl. ..................... 701/117; 701/201; 701/211; 455/414.3; 340/995.13; 340/905

(58) Field of Classification Search ............... 701/117, 701/213, 200, 201, 211; 455/414.3; 340/995.13, 340/905
See application file for complete search history.

(56) References Cited

U.S. PATENT DOCUMENTS

| 5,933,100 | A | 8/1999 | Golding | 340/995 |
|---|---|---|---|---|
| 6,263,276 | B1* | 7/2001 | Yokoyama et al. | 701/207 |
| 6,317,686 | B1* | 11/2001 | Ran | 701/210 |
| 6,356,836 | B1 | 3/2002 | Adolph | 701/208 |
| 2001/0029425 | A1* | 10/2001 | Myr | 701/200 |
| 2002/0091486 | A1* | 7/2002 | Hubschneider et al. | 701/209 |
| 2002/0152020 | A1 | 10/2002 | Seibel | 701/208 |

FOREIGN PATENT DOCUMENTS

| JP | 9-113290 | 5/1997 |
|---|---|---|
| WO | WO92/14215 | 8/1992 |

OTHER PUBLICATIONS

European Search Report dated Dec. 21, 2004.

* cited by examiner

*Primary Examiner*—Ian Q. Nguyen
(74) *Attorney, Agent, or Firm*—Kratz, Quintos & Hanson, LLP

(57) ABSTRACT

A storage section (160) stores a traffic jam prediction table containing a plurality of date classification IDs for classifying data for predetermined dates and time series data obtained by statistically processing past traffic conditions correlated to the date classification IDs in terms of temporal elements of the dates. A memory (170) stores calendar templates, each containing a plurality of pieces of date information and classification ID numbers, each of which is an ID number that corresponds to the date indicated by one of the pieces of date information and is same as one of the date classification IDs of the traffic jam prediction table. A navigation device (100) has a calendar modifier that appropriately modifies any of the classification ID numbers of the calendar templates.

18 Claims, 17 Drawing Sheets

FIG. 4

TRAFFIC JAM PREDICTION TABLE

| DATE CLASSIFICATION | WORK DAY | SATURDAY | SUNDAY LEGAL HOLIDAY | SPECIAL DAY 1 | SPECIAL DAY 2 | ... | DAY BEFORE A LONG HOLIDAY | STARTING DAY OF A LONG HOLIDAY | MIDDLE DAY OF A LONG HOLIDAY | FINAL DAY OF A LONG HOLIDAY | DAY BEFORE THE END OF A LONG HOLIDAY |
|---|---|---|---|---|---|---|---|---|---|---|---|
| DATE CLASSIFICATION ID | ID1 | ID2 | ID3 | ID4 | ID5 | ID6 | ID7 | ID8 | ID9 | ID10 | ID11 |
|  | TIME SERIES DATA | TIME SERIES DATA | ... |  |  |  |  |  |  |  | ... |

| SUNDAY | MONDAY | TUESDAY | WEDNESDAY | THURSDAY | FRIDAY | SATURDAY |
|---|---|---|---|---|---|---|
|  | 1<br>ID1 | 2<br>ID1 | 3<br>ID1 | 4<br>ID1 | 5<br>ID4 | 6<br>ID2 |
| 7<br>ID3 | 8<br>ID1 | ... | ... | ... | ... | ... |
| ... | ... | ... | ... | ... | ... | ... |
| ... | ... | ... | ... | ... | ... | ... |
| 28<br>ID3 | 29<br>ID1 | 30<br>ID1 | 31<br>ID1 |  |  |  |

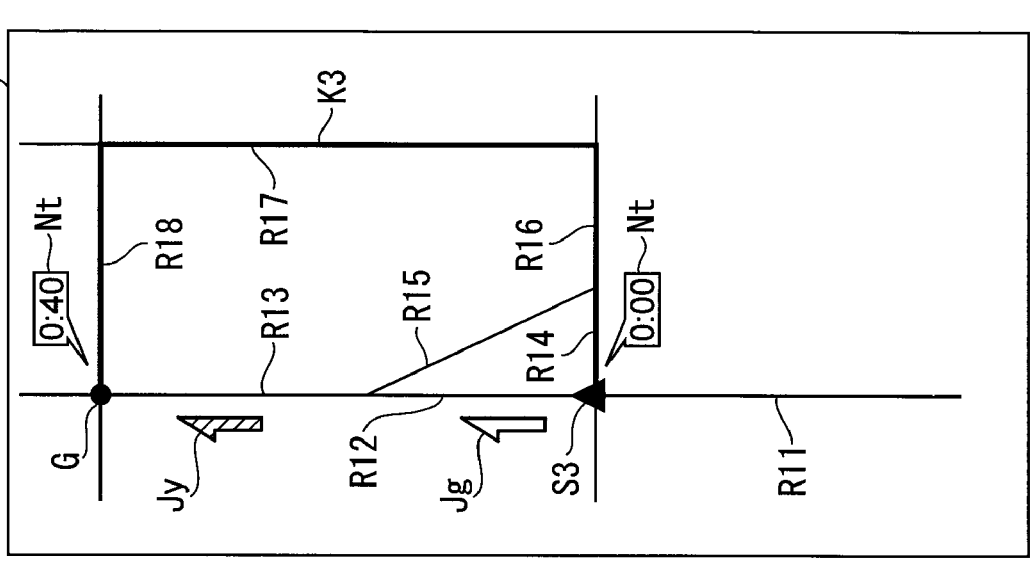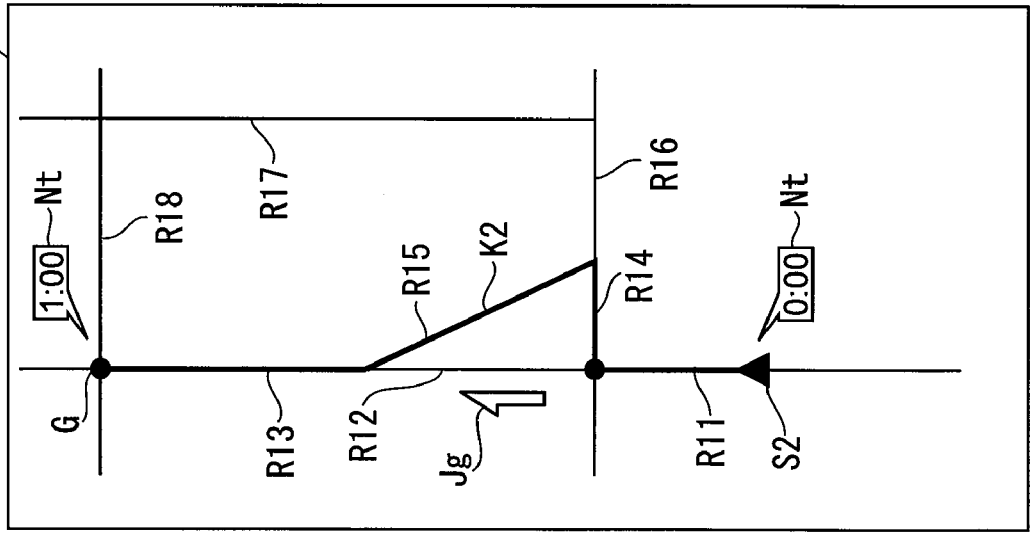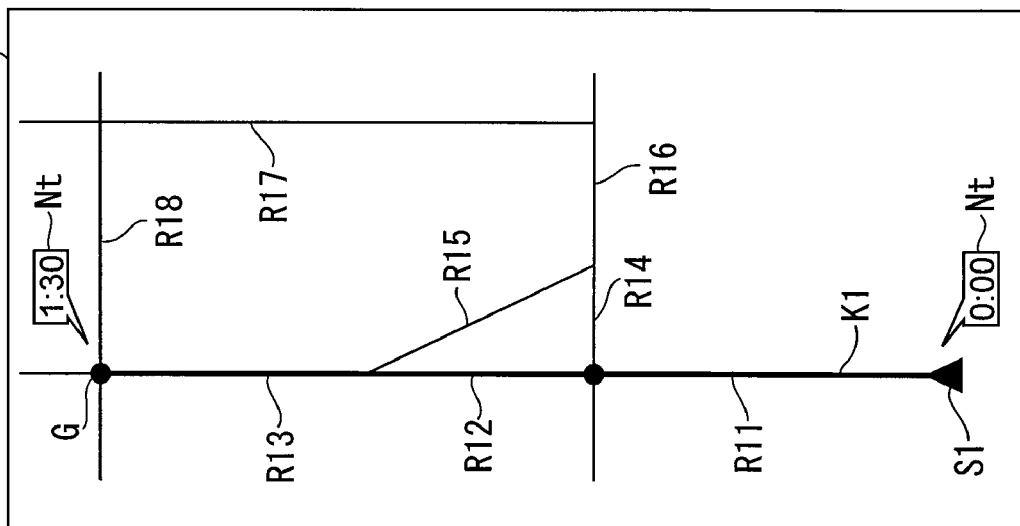

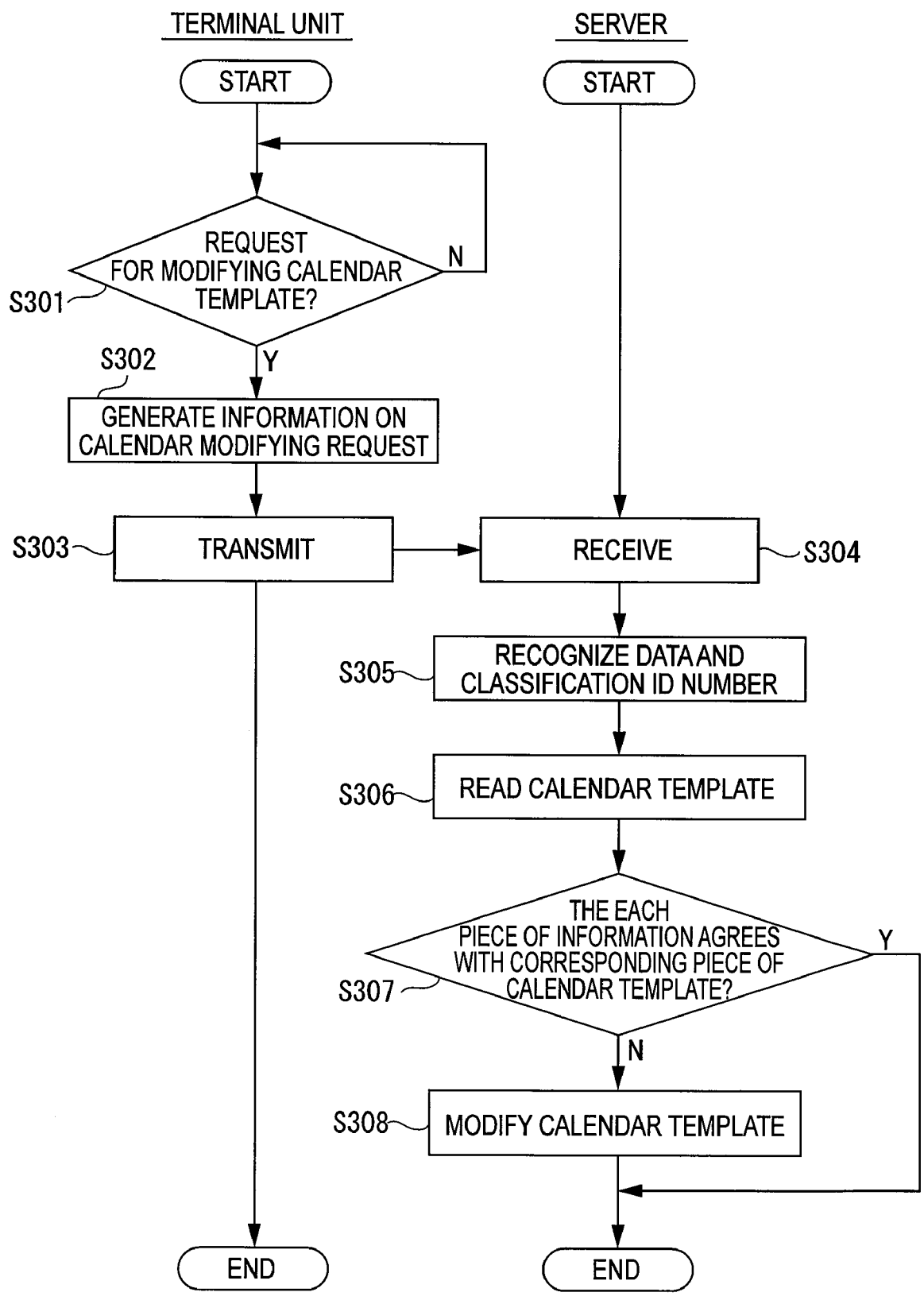

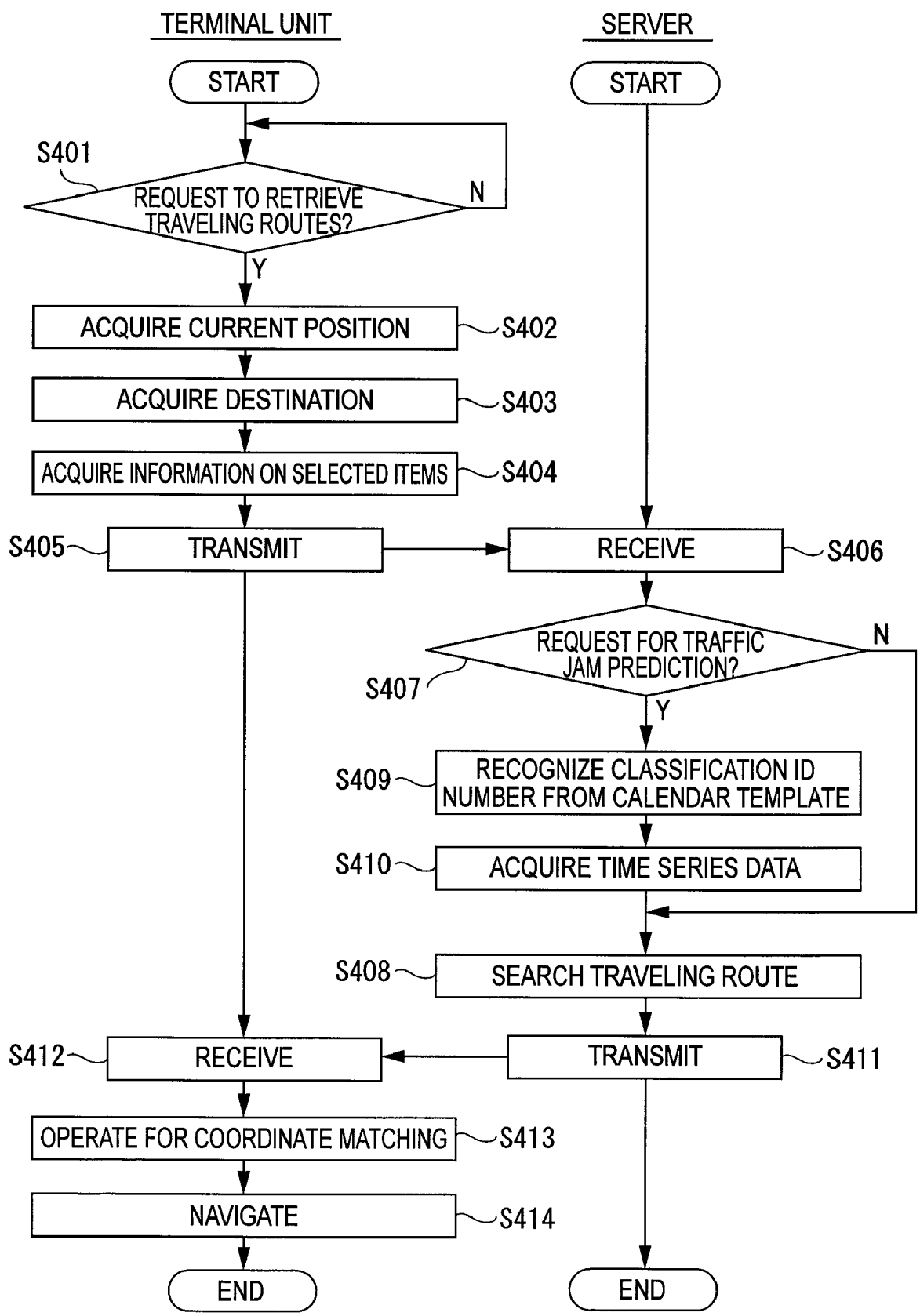

INFORMATION PROCESSING DEVICE, SYSTEM THEREOF, METHOD THEREOF, PROGRAM THEREOF AND RECORDING MEDIUM STORING SUCH PROGRAM

BACKGROUND OF THE INVENTION

1. Field of the Invention

The present invention relates to an information processing device for processing traffic information on past traffic conditions, a system thereof, a method thereof, a program thereof, and a recording medium storing such a program.

2. Description of Related Art

Vehicle navigation devices adapted to acquire traffic information on vehicle accidents, traffic jams and so on from a VICS (vehicle information communication system) and superimpose the acquired traffic information (on vehicle accidents, traffic jams and so on) on map information being displayed on a display unit of the vehicle navigation device for the purpose of notifying a user of the information are known. Meanwhile, when a traffic jam occurs, drivers who want to avoid the traffic jam may make a detour to consequently give rise to a secondary traffic jam. Since the VICS provides only the current traffic condition, drivers who make a detour, seeing the current traffic condition provided by the system, can be engulfed in a secondary traffic jam. Thus, there is a demand for improved vehicle navigation device that allow users to avoid traffic jams and take the best route to get to the destination.

On the other hand, vehicle navigation devices adapted to predict the traffic condition for now and in the future by using statistic data on traffic jams obtained by statistically processing information on past traffic jams and notify users of the predicted traffic condition for now and in the future are known (see prior art 1: Japanese Patent Laid-Open Publication No. 9-113290, p. 3, right column-p. 7, left column). A vehicle navigation device described in the above-cited prior art 1 is so designed that, upon recognizing an input by the user of a day of the week, a time zone and so on, it retrieves statistic traffic jam information data including statistic traffic jam information for the day of the week and the time zone input by the user and notifies the user of the retrieved statistic traffic jam information by superimposing it on the map information being displayed on the device in a display format that may vary depending on the traffic jam condition. With this arrangement, the user can predict the traffic jams that can take place now and those that can take place in the future according to the traffic jam information for the day of the week and the time zones of a day.

Further, when the navigation device as disclosed in the above-cited prior art 1 recognizes that an event such as a festival takes place on the day and in the time zone input by the user it retrieves statistic restrictions information data including statistic traffic jam information for the day and the time zone of the event that are input by the user. Then, the device notifies the user of the retrieved statistic restrictions information and notifies the user of the retrieved statistic restrictions information by superimposing it on the map information being displayed on the device in a display format that may vary depending on the traffic jam condition. With this arrangement, the user can predict the traffic jams that can take place now and those that can take place in the future due to the event on the day of the event.

However, the technique disclosed in the above-cited patent document is accompanied by problems. For example, if the day when the event is held can vary from year to year, for instance while it was held on August 1st last year but will be held on August 3rd this year, the statistic restrictions information data that corresponds to the day and the event may need to be updated every year and, since such statistic restrictions information data generally include statistic traffic jam information having a large volume of information, the operation of updating such statistic restrictions information data having a large volume of information every year imposes a large operational load.

SUMMARY OF THE INVENTION

It is therefore a principal object of the present invention to provide an information processing device that makes traffic information on past traffic conditions easily and appropriately available, a system thereof, a method thereof, a program thereof, and a recording medium storing such a program.

According to the present invention, the above object is achieved by providing an information processing device for processing statistic traffic information obtained by statistically processing traffic information on past traffic conditions in terms of temporal elements, the statistic traffic information including a plurality of pieces of date classifying information for classifying data for predetermined dates and statistic condition information obtained by statistically processing the traffic conditions on each of the dates correlated to the corresponding one of the plurality of pieces of date classifying information in terms of temporal elements; the device including: a date classification modifier adapted to modify the plurality of pieces of date classifying information included in data information which is formed as one data structure containing a plurality of pieces of date information indicating the dates and the plurality of pieces of date classifying information that corresponds respectively to the dates indicated by the plurality of pieces of date information.

In another aspect of the present invention, there is provided an information processing system including an information processing device according to the present invention and a terminal unit connected to the information processing device via a network so as to be able to exchange various pieces of information and having a request information generator for generating a modification request information requesting to modify the date classifying information of the data information and transmitting it to the information processing device, the date classification modifier being adapted to modify the date classifying information of the data information upon recognizing the reception of the modification request information transmitted from the terminal unit.

In still another aspect of the present invention, there is provided an information processing system including an information processing device according to the present invention and a terminal unit connected to the information processing device via a network so as to be able to exchange various pieces of information and having a terminal modification information generator for generating date information and date classifying information and transmitting them to the information processing device, the modification information acquirer being adapted to acquire the date information and the date classifying information transmitted from the terminal unit.

In still another aspect of the present invention, there is provided an information processing system including an information processing device according to the present invention and a server connected to the information processing device via a network so as to be able to exchange various pieces of information and having a server transmitter for acquiring date information and date classifying information and transmitting them to the information processing device, the modification information acquirer being adapted to acquire the date information and the date classifying information transmitted from the server.

In still another aspect of the present invention, there is provided an information processing method for processing statistic traffic information obtained by statistically processing traffic information on past traffic conditions in terms of temporal elements, the statistic traffic information including a plurality of pieces of date classifying information for classifying data for predetermined dates and statistic condition information obtained by statistically processing the statistic conditions on each of the dates correlated to the corresponding one of the plurality of pieces of date classifying information in terms of temporal elements; the method including: modifying a plurality of pieces of date classifying information included in data information which is formed as one data structure containing a plurality of pieces of date information indicating the dates and the plurality of pieces of date classifying information that corresponds respectively to the dates indicated by the plurality of pieces of date information.

In still another aspect of the present invention, there is provided an information processing program for having a computer to execute an information processing method according to the present invention.

In a further aspect of the present invention, there is provided a recording medium computing-device-readably storing an information processing program according to the present invention.

BRIEF DESCRIPTION OF THE DRAWINGS

FIG. 4 is a schematic conceptual illustration of the table structure of data in a traffic jam prediction table of the first embodiment;

FIG. 8 is a schematic conceptual illustration of the table structure of data in a calendar template as updated by the calendar modifying section of the first embodiment;

FIGS. 10A through 10C are schematic illustrations of images of a traveling route that can be displayed by the first embodiment. FIG. 10A is a schematic illustration of an image that can be displayed when the embodiment searches for a traveling route to a selected position, FIG. 10B is a schematic illustration of an image that can be displayed when the embodiment searches for a traveling route to the position when a predetermined time period has elapsed from FIG. 10A, and FIG. 10C is a schematic illustration of an image that can be displayed when the embodiment searches for a traveling route to the position when a predetermined time period has elapsed from FIG. 10B;

FIG. 16 is a flow chart of the operation of modifying the calendar template of the second embodiment; and FIG. 17 is a flow chart of the operation of searching for a traveling route of the second embodiment.

DETAILED DESCRIPTION OF PREFERRED EMBODIMENT(S)

First Embodiment

Figure 1:
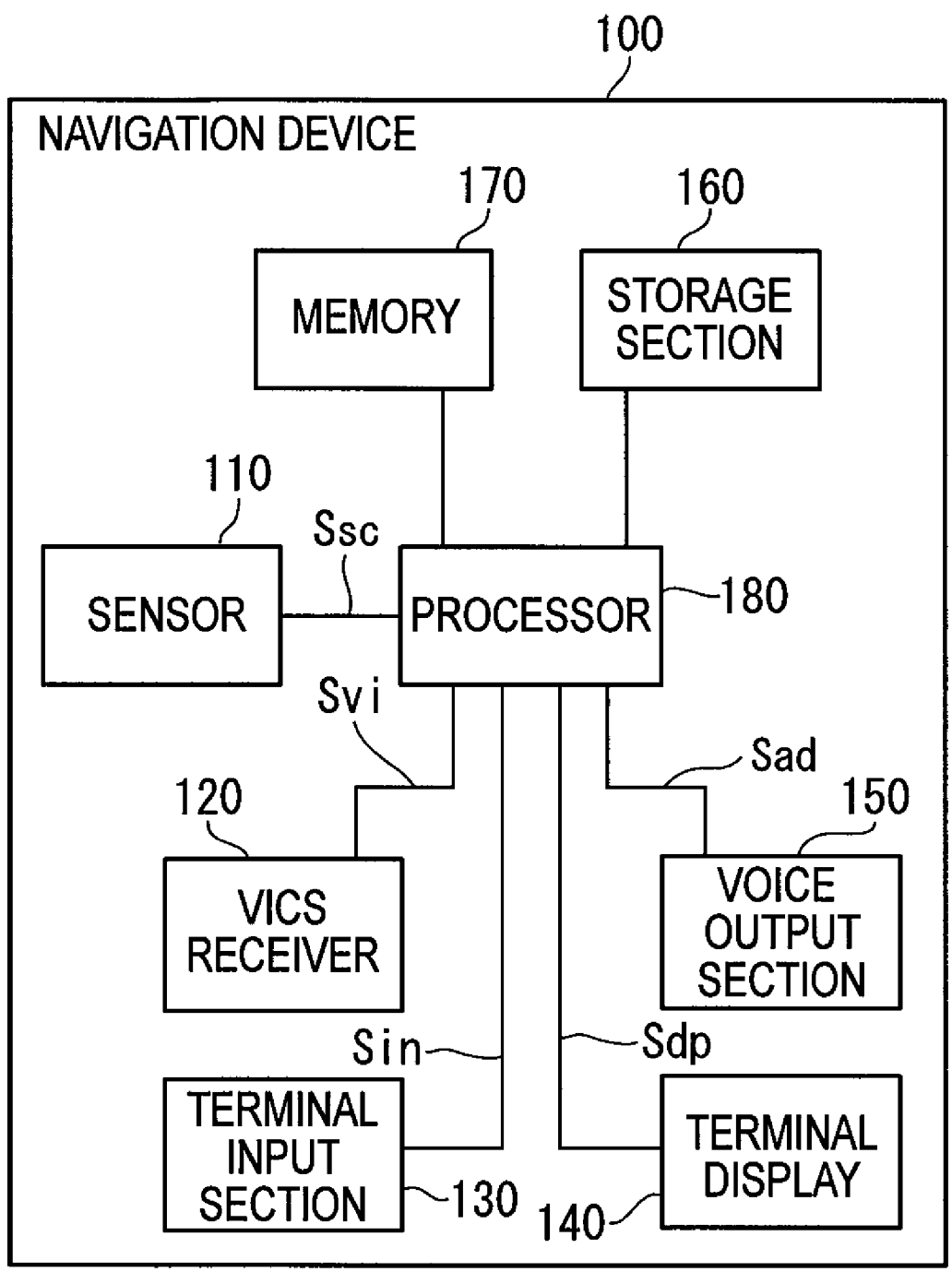
FIG. 1 is a schematic block diagram of a first embodiment of a navigation device according to the present invention, showing the configuration thereof.
Figure 2:
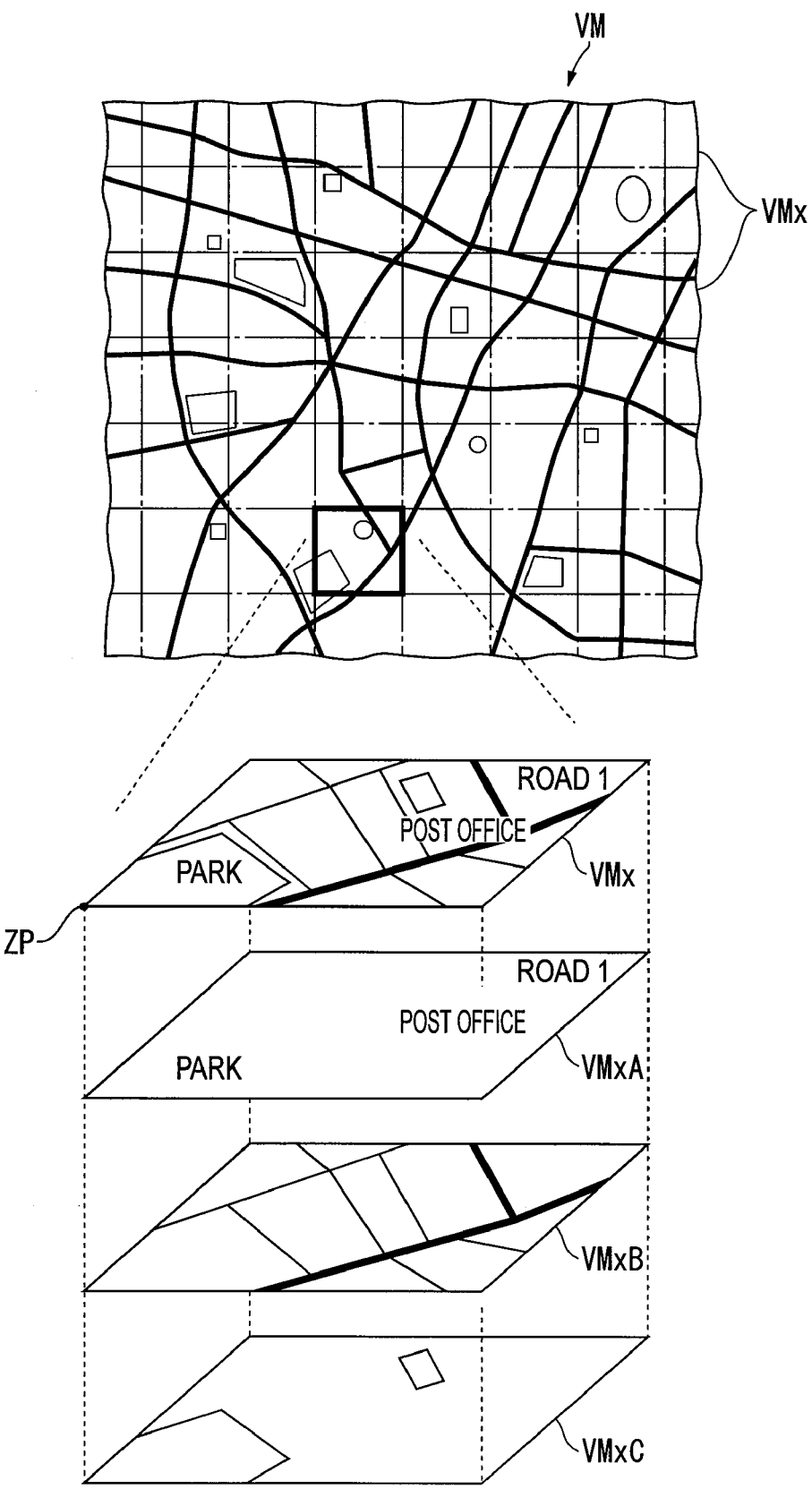
FIG. 2 is a schematic conceptual illustration of a table structure of data to be displayed on a map of the first embodiment.
Figure 3:
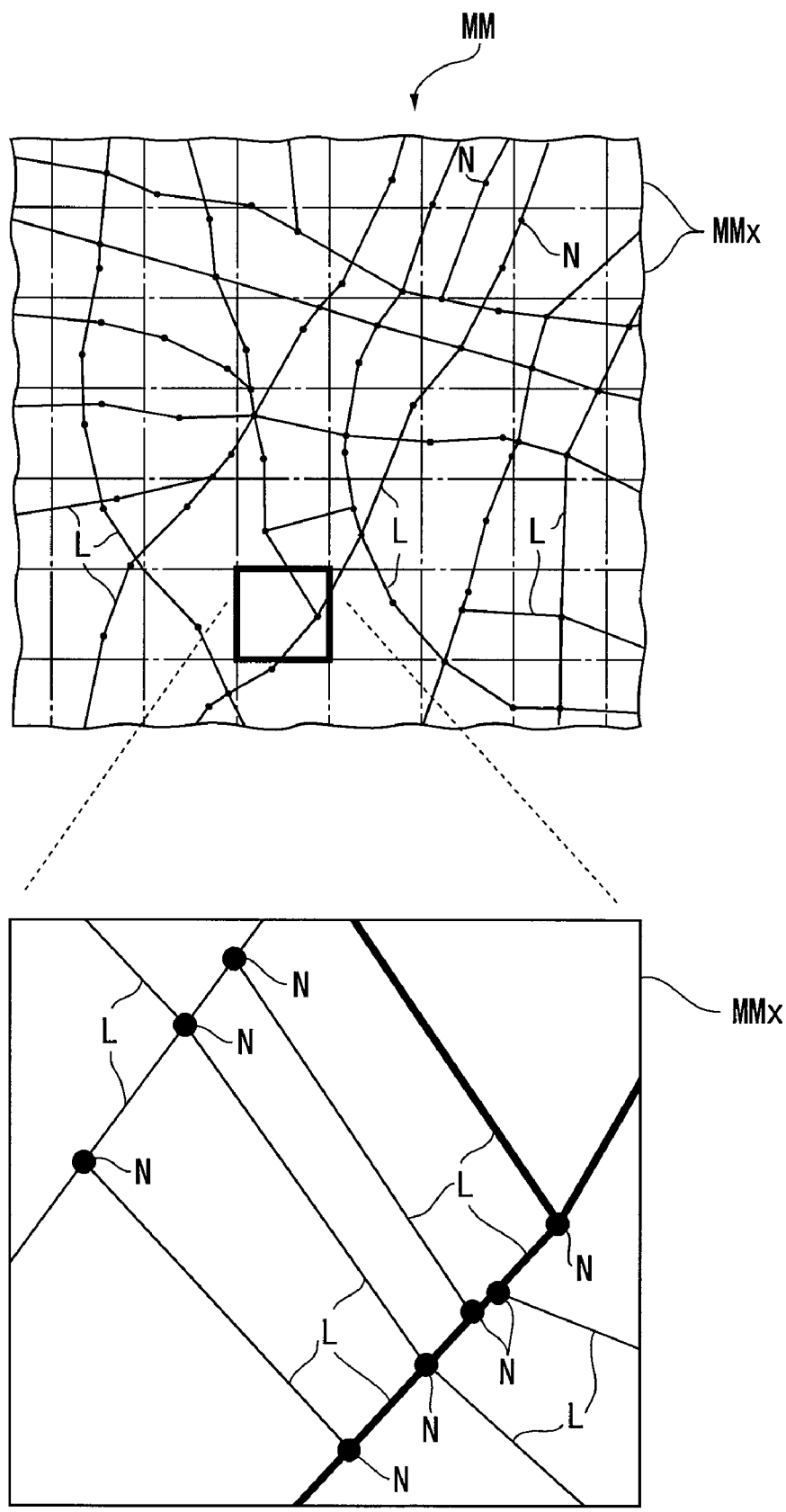
FIG. 3 is a schematic conceptual illustration of the table structure of matching data to be displayed on a map of the first embodiment.
Figure 5:
FIG. 5 is a schematic conceptual illustration of the table structure of data in a calendar template of the first embodiment.
Figure 6:
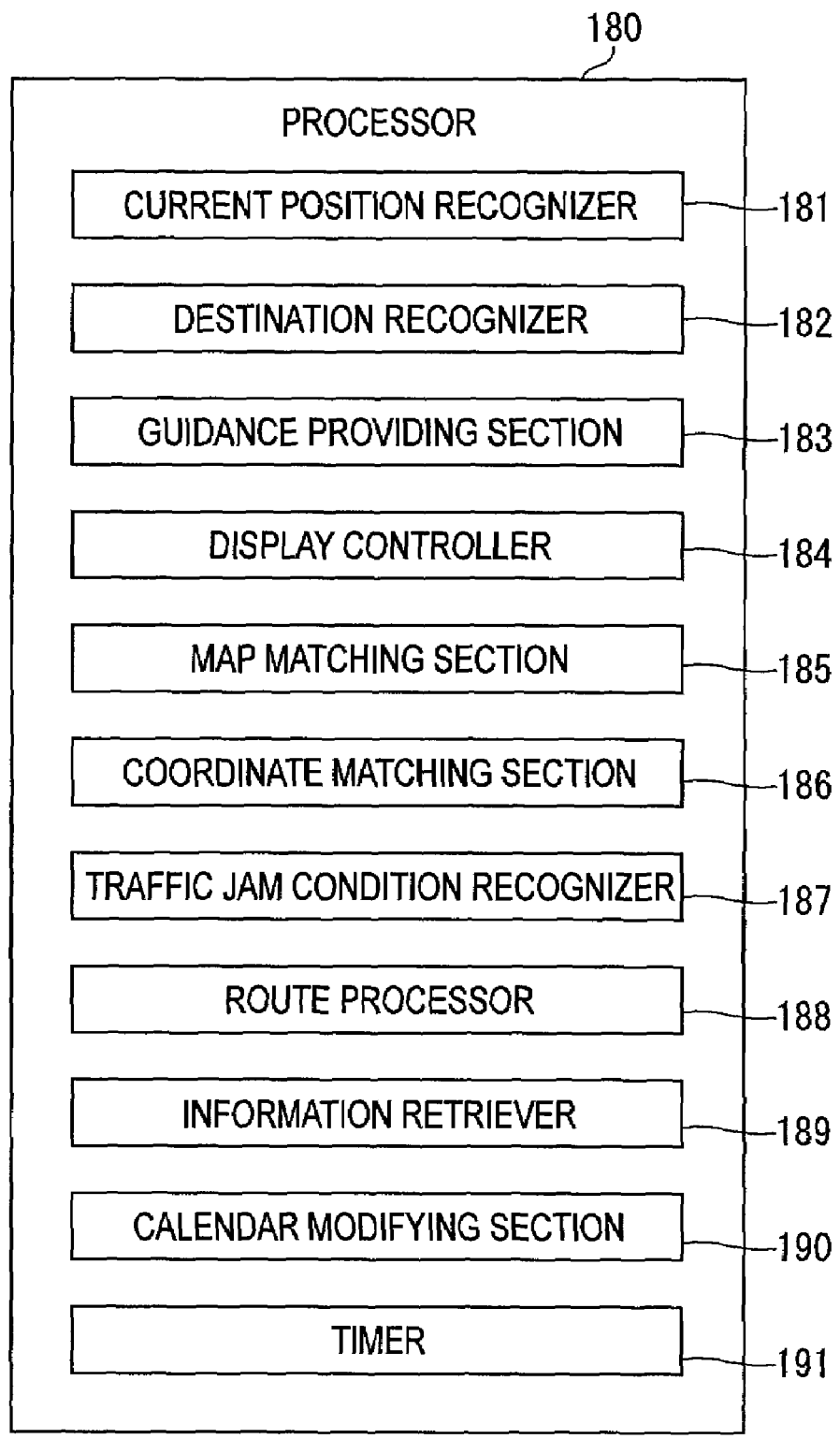
FIG. 6 is a schematic block diagram of a processor of the navigation device of the first embodiment.

Now, the first embodiment of the present invention will be described by referring to the accompanying drawings. This embodiment of information processing device is a navigation device for navigating a driver of a moving body such as a vehicle, for example, in response to the moving condition thereof. However, it should be noted that an information processing device according to the present invention is not necessarily arranged in a vehicle. It can be arranged in any moving body in order to notify the driver of the moving body of the traffic condition thereof. FIG. 1 is a schematic block diagram of the first embodiment of navigation device according to the present invention, showing the configuration thereof. FIG. 2 is a schematic conceptual illustration of the table structure of data to be displayed on a map. FIG. 3 is a schematic conceptual illustration of the table structure of matching data to be displayed on a map. FIG. 4 is a schematic conceptual illustration of the table structure of data in a traffic jam prediction table. FIG. 5 is a schematic conceptual illustration of the table structure of data in a calendar template. FIG. 6 is a schematic block diagram of the processor of the navigation device.

[Configuration of Navigation Device]

In FIG. 1, reference symbol 100 denotes a navigation device that is an information processing device. The navigation device 100 navigates a user of the vehicle as a moving body in response to the moving condition of the vehicle. However, for the purpose of the present invention, the moving body is not limited to a vehicle and may alternatively be an aircraft, a ship or the like. The navigation device 100 may be realized in the form of a vehicle-mounted type device to be mounted in a vehicle, a portable type device, a PDA (personal digital assistant), a portable phone, a PHS (personal handyphone system), a portable personal computer or the like. The navigation device 100 searches for information on the current position and the destination, searches for and displays the traveling route to the destination as well as a predetermined store that is located in the vicinity of the current position of the vehicle, including the services the store provides, on the basis of the map information it has. As shown in FIG. 1, the navigation device 100 includes a sensor 110, a VICS (vehicle information communication system) receiver 120, a terminal input section 130, a terminal display 140 that is a notifying device, a voice output section 150, a storage section 160, a memory 170 that is also a storage, a processor 180 and so on. The modification information generator of the present invention is formed by the terminal input section 130 and the processor 180.

The sensor 110 detects the moving condition of the moving body on which it is mounted, which may be a vehicle, including the current position and the running condition of the vehicle, and outputs signal Ssc of a predetermined format to the processor 180. The sensor 110 typically has various sensors including a GPS (global positioning system) receiver (not shown), a speed sensor (not shown), an azimuth sensor and an acceleration sensor.

The GPS receiver receives the navigation electric wave output from the GPS satellite (not shown), which is an artificial satellite, by a GPS antenna (not shown). It then computes the assumed coordinate values of the current position according to the received signal of the navigation electric wave and outputs the outcome of the computation to the processor 180 as GPS data.

The speed sensor of the sensor 110 is arranged on the moving body, which may be a vehicle, to detect the running speed and the actual acceleration of the vehicle according to a signal that varies as a function of the traveling speed, or the moving speed, of the vehicle. The speed sensor typically reads the pulse signal or the voltage value that is output as a function of the revolutions per unit time of the axles or the wheels of the vehicle. Then, the speed sensor outputs the detected information, which is the pulse signal or the voltage value it reads or the like, to the processor 180. The azimuth sensor of the sensor 110 is also arranged on the vehicle and has a gyro-sensor (not shown) to detect the azimuth of the vehicle, namely, the running direction of the forwardly moving vehicle. The azimuth sensor outputs a signal representing the detected running direction to the processor 180. The acceleration sensor of the sensor 110 is also arranged on the vehicle to detect the acceleration of the vehicle in the running direction thereof. The acceleration sensor typically converts the detected acceleration into a sensor output value in the form of a pulse or a voltage and outputs it to the processor 180.

The VICS receiver 120 has a VICS antenna (not shown) and acquires traffic information by way of the antenna. More specifically, it acquires traffic information (to be referred to as VICS data hereinafter) on traffic jams, traffic accidents, road construction works, traffic restricting operations and so on from the VICS (not shown) by way of a beacon or FM multiplex broadcasting and outputs signal Svi of a predetermined format relating to the acquired traffic information to the processor 180.

VICS data has a table structure typically containing a plurality of conceptual items that are coordinated into a single data as shown below.

traffic jam rating: traffic jams, congestions, smooth traffic, etc.
leading position of each traffic jam
length of each traffic jam
link traveling time information: the traveling time necessary for the vehicle to run between two consecutive traffic lights, which is a VICS link
road section traveling time information: the traveling time necessary for the vehicle to run by a given road section that is longer than the distance of a VICS link
restrictions, causes of restrictions, restricted road sections
information on vacancies in parking areas
information on service areas and parking areas
other information The terminal input section 130 typically includes a keyboard and a mouse as well as various operation buttons and operation knobs (not shown) to be used for input operations. The operation buttons and the operation knobs are used to specify, for example, operations of the navigation device 100. More specifically, they may be used to specify the type of information to be acquired and/or the requirements to be met when acquiring information, to specify the destination, to retrieve information and to make the running condition, which is the moving condition of the vehicle, be displayed. In response to an operation by the vehicle user, the terminal input section 130 outputs a predetermined signal Sin to the processor 180. In addition to or in place of the operation buttons and the operation knobs, the terminal input section 130 may also be a touch panel that may be arranged at the terminal display 140 for input operations, a voice input section, or the like.

The terminal display 140 is controlled by the processor 180 and adapted to display images for signal Sdp from the processor 180. Images that are displayed on the terminal display 140 include map information and images of retrieved information, TV programs received by a TV receiver (not shown), images stored in one or more than one external devices such as optical discs, magnetic discs, memory cards and other recording mediums and read by respective drives or drivers and images from memory 170. The terminal display 140 may typically be a liquid crystal panel, an organic EL (electroluminescence) panel, a PDP (plasma display panel), a CRT (cathode ray tube) and the like.

The voice output section 150 includes a speaker or some other voicing section (not shown). The voice output section 150 is controlled by the processor 180 and outputs voices by way of the voicing section for various signals Sad from the processor 180 including those for voice data. Voiced information output from the voice output section 150 includes the running direction and the running condition of the vehicle, the traffic condition and so on. The vehicle user is notified of and navigated by the voiced information. The voicing section may be used to output TV sounds received by a TV receiver (not shown) and sounds stored in the memory 170. The voice output section 150 may not be limited to an arrangement having a voicing section, but also can be an arrangement that uses some other voicing section with which the vehicle is provided as standard equipment.

The storage section 160 readably stores map information for maps as shown in FIGS. 2 and 3 and a traffic jam prediction table 10 as shown in FIG. 4 that provides statistic traffic information. The storage section 160 includes a map information storage area for storing map information and a traffic jam prediction table storage area for storing the traffic jam prediction table 10. However, the storage section 160 does not necessarily have the two storage areas that are specifically described above and may have no storage area or include some other storage areas. The storage section 160 may include drives or drivers for readably storing data on storage mediums such as HDs (hard discs), a DVDs (digital versatile discs), optical discs and memory cards.

For the purpose of the present invention, map information may include display data VM, which are so-called POI (point of interest) data for map information as shown in FIG. 2, matching data MM for map information as shown in FIG. 3, map data for searching for the traveling route and so on.

Display data VM include a plurality of pieces of display mesh information VMx, each carrying a specific suffix number. More specifically, the map information of a given geographical area that is formed by display data VM is vertically and horizontally divided into a plurality of pieces of display mesh information VMx. Each piece of the display mesh information VMx may be further divided into a plurality of pieces of display sub-mesh information VMx. The display mesh information VMx are rectangles with same dimensions and show respective geographical strips with a reduced scale. The map information is provided at a corner thereof with a geographical index of the entire map, which may be values expressed in terms of the absolute coordinates ZP of the earth.

Each display mesh information VMx contains, for example, name information VMxA that designates a name of crossings or the like, road information VMxB and background information VMxC. The name information VMxA such as the names of the crossings and other spots are miscellaneous elemental data of the strip that are arranged in a table structure. They are adapted to be displayed at predetermined respective positions in terms of the absolute coordinates ZP. The road information VMxB are road elemental data of the strip that are arranged in a table structure. They are adapted to be displayed at predetermined respective positions in terms of the absolute coordinates ZP. The background information VMxC include marks of well-known buildings and other spots. They are also miscellaneous elemental data of the strip that are arranged in a table structure and adapted to be displayed at predetermined respective positions in terms of the absolute coordinates ZP.

On the other hand, matching data MM include a plurality of pieces of matching mesh information MMx, each carrying a specific suffix number. More specifically, as in the case of the display data VM, the map information of a given geographical area is vertically and horizontally divided into a plurality of pieces of matching mesh information MMx. Each piece of the matching mesh information MMx may be further divided into a plurality of matching sub-mesh information MMx. The matching mesh information MMx are rectangles with same dimensions and show respective geographical strips with a reduced scale. The map information is provided at a corner thereof with a geographical index of the entire map, which may be values expressed in terms of the absolute coordinates ZP of the earth. Each piece of matching mesh information MMx may have a data structure that is different from that of each piece of display mesh information VMx. In other words, the matching mesh information MMx may have dimensions different from those of the display mesh information VMx. If both the display mesh information VMx and the matching mesh information MMx have the same reduced dimensions, the data of the display mesh information VMx and those of the corresponding matching mesh information MMx may be provided with the same and unique number to identify their relationship. If the display mesh information VMx have reduced dimensions different from those of the matching mesh information MMx, the relationship between the data of the display mesh information VMx and those of the corresponding matching mesh information MMx may typically be identified by the absolute coordinates.

When, for example, a symbol representing the moving vehicle is superimposed on the map information, the matching data MM are used to prevent from being placed not on the road but on a building by error. In other words, the matching data MM are used for map matching processing for placing the symbol of the vehicle on the right road. The matching data MM includes a plurality of pieces of link string block information.

Link string block information as used herein refers to information having a table structure showing correlations of links L that are line segments and constitute roads, each connecting a pair of nodes N representing respective spots on a road as shown in FIG. 3. The correlations of links L are established on the basis of predetermined rules. For example, a road, which may be the Koshu Road or the Ome Road, is expressed as a link string that is formed by a number of mutually correlated broken lines, or links L. Each link L is provided with line-segment-specific information (to be referred to as link ID hereinafter) that is a suffix number of the link L and node information specific to each of the pair of nodes N connected by the link L, which may be a number specific to the node.

A node N may represent a road crossing, a bending point of a road, a fork of roads or a junction of roads. The information on a node N includes spot-specific-information that is a suffix number of the node N in the link string block information, the coordinates of the position of the node N and a flag that indicates if the node represents a branching position such as a road crossing or a fork of roads, where a plurality of links meet, or not. The information on a node N may alternatively include only spot-specific-information and coordinates and does not include a flag so that it shows only the profile of each of the links, or roads, related to the node. Still alternatively, it may include information on the attributes of the links related to it such as information on the width and the number of lanes of each of the links, or roads, related to the node. If a node N does not have a flag and shows only the profile of each of the roads related to it, it will not be used to identify the spot by coordinate matching section 186, which will be described in greater detail hereinafter.

Further, the link string block information of the matching data MM is correlated with information on the road structure including the number of lanes of the road, whether the road is main road or not, classification of the road such as, a national road, sate road or toll road, or the tunnel. According to the information on the road structure, the road can be displayed on a map in response to the display data VM.

Map information for searching the traveling route of the vehicle typically have a table structure similar to that of the matching data MM. In other words, they have a table structure with spot information on spots on roads as represented by nodes N and link information on line segment information on line segments as represented by links L. They are used for the purpose of searching for the traveling route of the vehicle.

The traffic jam prediction table 10 provides statistic traffic information obtained by statistically processing past traffic conditions in terms of the time zones of a day. It includes data showing traffic conditions of a geographical location in the past. The traffic jam prediction table 10 is used to predict traffic jams when searching for the traveling route or when displaying a map. The traffic jam prediction table 10 has a table structure as shown in FIG. 4, where a plurality of combinations of a date classification ID (identification) 11 and time series data 12$i$ (i being a natural number) as place-specific statistic traffic information are recorded and each of the combinations is referred to as record.

A date classification ID 11 is an ID number specific to a particular date of the year and a particular day of the week. In the following description, classification in terms of dates and days of the week is referred to as date classification. For example, "ID1" may indicate any "workday" between Monday and Friday that is not a legal holiday and "ID2" may indicate "Saturday" that is not a legal holiday, whereas "ID4" may indicate "special day 1" which is a festival day of City A and "ID5" may indicate "special day 2" which is a day when sports matches take place in Athletic Ground B. Similarly, "ID7" may indicate the day before four consecutive holidays, or "the day before a long holiday", and "ID 11" may indicate the third day of four consecutive holidays, or "the day before the end of a long holiday". Date classification IDs 11 are not necessarily ID numbers. They may alternatively be text data directly and respectively related to dates such as "workdays".

Time series data 12i are data showing tendencies of traffic jam conditions obtained by statistically processing the data acquired, for example, from the VICS, or VICS data, that are accumulated for each VICS link, for every 10 minutes classified as temporal elements by the date classification system. More specifically, time series data 12i may include data showing one or more than one traffic jams at certain locations on each VICS link in predetermined time zones such as the length of each specific one of the traffic jams, the traffic jam ratings or the traffic jam conditions of the traffic jams and the time required for escaping each specific one of the traffic jams. While time series data 12i are described above as data generated by statistically processing data for every time zone that is defined as temporal element by the date classification system, they may not necessarily be limited thereto and may alternatively be generated by using facilities, shops for each administrative unit, which may be a city, a town or a village and/or for each road.

The storage section 160 stores retrieval information necessary for acquiring information on a predetermined spot as map information. More specifically, retrieval information includes information on the designations of prefectures, cities, towns, villages, districts and areas that are used to pinpoint a spot, guidance information and information on shops that are also used to pinpoint a spot. Retrieval information is stored to show a table structure where pieces of information on items are arranged hierarchically in the form of tree structure.

The memory 170 readably stores information on specified items that are input at the terminal input section 130, music data and image data as well as a plurality of calendar templates 20 that are so many data as shown in FIG. 5. The memory 170 also stores various application programs to be developed on the OS (operating system) of the navigation device 100 that controls the operation of the entire navigation device 100. The memory 170 preferably includes a CMOS (complementary metal-oxide semiconductor) memory that retains the data it stores even in the case of black out where the power supply is suddenly interrupted. The memory 170 may alternatively include a drive or a driver for readably storing data on a recording medium such as HD, DVD or optical disc.

The calendar templates 20 are templates showing date classification of dates. More specifically, each calendar template 20 contains table data including dates, classification ID numbers that are pieces of date classifying information assigned to respective dates and so on and typically a total of twelve calendar templates are provided to correspond to the months of a year so as to form a table structure.

A classification ID number is the same as one of the date classification IDs 11 of traffic jam prediction tables 10 and indicates the date classification of a date specified by date information. For example, in FIG. 5, Friday 5th is classified as "workday" that is identified by "ID1", whereas Monday 15th is classified as "legal holiday" that is identified by "ID3". The classification ID numbers of the calendar templates 20 may be modified appropriately by the processor 180. The classification ID numbers are not necessary numerical values and may alternatively be so arranged as to show a data structure using text data corresponding to the date classification IDs of the traffic jam prediction tables 10 such as "workday".

The processor 180 has various input/output ports (not shown) including a VICS reception port connected to a VICS antenna, a GPS reception port connected to a GPS receiver, sensor ports connected to respective various sensors, a key input port connected to the terminal input section 130, a display control port connected to the terminal display 140, a voice control port connected to the voice output section 150, a storage port connected to the storage section 160 and a memory port connected to the memory 170. As shown in FIG. 6, the processor 180 has as various programs a current position recognizer 181, a destination recognizer 182, a guidance providing section 183, a display controller 184 which also operates as notification control section, a map matching section 185, a coordinate matching section 186, a traffic jam condition recognizer 187 which operates as traffic condition predictor, condition information acquirer, and date classification recognizer, a route processor 188 which operates as positional information acquirer and traveling route searching section, an information retriever 189, a calendar modifying section 190 which operates as date classification modifier and modification information acquirer, a timer 191 and so on.

The current position recognizer 181 recognizes the current position of the vehicle. More specifically, it computationally determines a plurality of assumed current positions of the vehicle on the basis of the speed data and the azimuth data output respectively from the speed sensor and the azimuth sensor of the sensor 110. Further, the current position recognizer 181 recognizes the current assumed coordinate values of the vehicle on the basis of the GPS data relating to the current position as output from the GPS receiver. Then, the current position recognizer 181 compares the computationally determined assumed current position and the current assumed coordinate values of the vehicle it recognizes and computationally determines the current position of the vehicle on the map information acquired separately to recognize the current position of the vehicle.

Furthermore, the current position recognizer 181 determines the inclination and the level difference of the road on which the vehicle is running on the basis of the acceleration data output from the acceleration sensor and computationally determines the assumed current position of the vehicle to recognize the current position of the vehicle. Thus, it can accurately recognize the current position of the vehicle even at a spot where two or more than two roads intersect each other on a plan view such as a multi-level crossing of an ordinary road or a high way. Further, when the vehicle is running on a slope or a mountain road, it corrects the error of the moving distance obtained only on the basis of the speed data and the azimuth data that differs from the actual running distance of the vehicle by taking the detected inclination of the road into consideration to accurately recognize the current position of the vehicle.

The current position recognizer 181 can recognize the starting point that is selected and input by way of the terminal input section 130 also as assumed current position in addition to the above-described current position of the vehicle. The positional information and the various pieces of information for specifying positions that are acquired by the current position recognizer 181 are stored appropriately in the memory 170.

The destination recognizer 182 typically acquires positional information on the destination of the vehicle and destination information, or position specifying information, as selected and input by operating the terminal input section 130 and recognizes the position of the destination. Pieces of destination information that can be selected and input include the coordinate values of the destination as expressed in terms of latitude and longitude, the address of the destination and the telephone number of the telephone at the destination if they can be used to locate the destination. The destination information recognized by the destination recognizer 182 is appropriately stored in the memory 170.

The guidance providing section 183 provides guidance for driving the vehicle to support the user on the basis of the traveling route information and the feature guidance information acquired in advance in response to the running condition of the vehicle and stored in the memory 170. The guidance may be provided in the form of images displayed on the terminal display 140 and/or in voice sounded by the voice output section 150. For example, a predetermined arrow and/or a sign may be displayed on the display screen of the terminal display 140 and/or a voice guidance such as "Turn right toward ΔΔ at oo crossing 700 m ahead", "The vehicle deviated from the traveling route" or "A traffic jam is ahead" may be sounded from the voice output section 150.

The display controller 184 appropriately controls the terminal display 140 so as to cause it to display various pieces of information on the terminal display 140. The display controller 184 also controls the terminal display 140 to display images for prompting the user to operate the terminal input section 130 so as to select and input various pieces of information.

The map matching section 185 operates for map matching processing necessary for displaying the current position of the vehicle as recognized by the current position recognizer 181 on the map information obtained from the storage section 160. The map matching section 185 typically utilizes matching data MM for map matching processing of modifying or correcting the information on the current position so that the current position of the vehicle as indicated by a mark that is superimposed on the map being displayed on the terminal display 140 may not be shifted from the road in the map on the terminal display 140.

The coordinate matching section 186 operates for coordinate matching processing necessary for determining if the pieces of information on two nodes N contained in the matching data MM of the map information obtained from the storage section 160 as spot information indicate the same and identical spot or not. In other words, the coordinate matching section 186 acquires spot information on two nodes N contained in the matching data MM and reads the coordinate information of the spot information. More specifically, it computationally determines the coordinate values of each node N such as the latitude and the longitude on the basis of the coordinate values and the offset quantities contained in the coordinate information and if the nodes N show the same and identical coordinate values, it reads the flag in the spot information of each of the nodes N and judges if the nodes N are identical with each other or not. If it judges that the two nodes are identical with each other, it determines that two links L that are connected to the respective nodes N and have different pieces of link string block information intersect each other and the nodes N represent the same crossing. If, on the other hand, it judges that the two nodes N are not identical with each other, it determines that the two links L that are connected to the respective nodes N and have different pieces of link string block information do not intersect each other and hence the nodes N represent a multi-level crossing.

The traffic jam condition recognizer 187 generates current traffic jam information relating to the traffic jam(s) that are currently present. More specifically, it appropriately acquires VICS data from the VICS as output from the VICS receiver 120. Then, it generates current traffic jam information relating to the traffic jam(s) that are currently present in an area containing the current position of the vehicle and the destination or in a predetermined area surrounding the current position of the vehicle.

Further, the traffic jam condition recognizer 187 determines the expected arrival time of the vehicle when the vehicle gets to the destination. For example, firstly it determines the expected arrival time of the vehicle when the vehicle gets to a selected position on the route to the destination. Then, it generates traffic jam prediction information relating to prediction of the traffic jam that may arise at the selected position before the vehicle gets to the destination or at a scheduled clock time selected and input in advance on the basis of the acquired expected arrival time, the expected arrival time that is selected and input in advance and the time series data 12i as well as other information.

More specifically, the traffic jam condition recognizer 187 recognizes the classification ID number of the date for which traffic jam(s) will be predicted on the basis of the clock time information obtained from the timer 191 and the related calendar template 20. Then, it retrieves and acquires the time series data 12i for the area that corresponds to the recognized classification ID number and contains the current position and the destination from the traffic jam prediction tables 10. Subsequently, it determines the expected arrival time of the vehicle when the vehicle gets to a selected position on the candidate traveling route to the destination as identified by candidate traveling route information generated by the route processor 188, which will be described in greater detail hereinafter, on the basis of the current clock time acquired from the timer 191.

Techniques for determining the expected arrival time include the following. Firstly, the distance to a selected position on the candidate traveling route is recognized from the candidate traveling route information and the time required to travel by the recognized distance is determined on the current traffic jam information. Subsequently, the expected arrival time is determined on the basis of the obtained required time and the current clock time. Then, traffic jam prediction information is generated on the basis of the time series data 12i and the expected arrival time.

The route processor 188 searches for the traveling route by computationally determining the traveling route of the vehicle on the basis of the information on the selected items for defining the route as input by the vehicle user and the map information stored in the storage section 160. The route processor 188 can computationally determine the traveling route by taking the current traffic jam information and the predicted traffic jam information as generated by the traffic jam condition recognizer 187 into consideration when the processor 180 recognizes as acquisition request signal a request for predicted traffic jam information requesting a traveling route to be searched for by considering the current traffic jam information and the predicted traffic jam information.

More specifically, if the information on the selected items does not contain any request for predicted traffic jam information, the route processor 188 simply acquires the current position, the destination, the information on the selected items and the current traffic jam information. Then, it searches for roads on which the vehicle can travel, utilizing the map information for searching the traveling route of the vehicle on the basis of the acquired information, and generates traveling route information in which the route requiring the minimum traveling time, the route of the minimum traveling distance and routes that can avoid traffic jams and traffic control operations are specified. Then, it determines the traveling time required to get to the destination for each of the routes contained in the traveling route information and generates required time information.

If, on the other hand, the information on the selected items contains a request for predicted traffic jam information, the route processor 188 acquires the current position, the destination, the information on the selected items and the current traffic jam information, taking the predicted traffic information into consideration. Then, it searches for roads on which the vehicle can travel and generates candidate traveling route information in which the route requiring the minimum traveling time, the route of the minimum traveling distance and routes that can avoid traffic jams and traffic control operations are specified. Then, it acquires the current traffic jam information and the predicted traffic jam information and generates traveling route information that specifies traveling routes by narrowing the candidate traveling routes contained in the candidate traveling route information to a fewer number of candidate traveling routes on the basis of the acquired information. Then, it determines the traveling time required to get to the destination for each of the routes contained in the traveling route information and generates required time information on the required time for each of the routes.

When searching for the traveling routes, the matching data MM of the map information may be used along with the map information for searching the traveling route of the vehicle when, for example, the traveling route is searched for so as to utilize passages not contained in the map information for searching the traveling route of the vehicle such as back lanes and other lanes. The judgment of the coordinate matching section 186 on road conditions provides basis for searching for the traveling route when the matching data MM are used. The traveling route information also contains route guidance information for guiding and assisting the vehicle user driving the vehicle. The route guidance information may be appropriately displayed on the terminal display 140 and/or sounded from the voice output section 150 under control of the guidance providing section 183 to assist the vehicle user driving the vehicle.

The information retriever 189 acquires the retrieval information stored in the storage section 160, hierarchically retrieving the information on the basis of the specified items such as shops and facilities in response to a retrieval request for retrieval information as specified and input at the terminal input section 130.

The calendar modifying section 190 appropriately updates the calendar templates 20 stored in the memory 170 on the basis of the modifications specified and input by the user. More specifically, the calendar modifying section 190 recognizes various pieces of information specified and input by the user by way of the terminal input section 130. The specified pieces of information may include information on a specific date and information on an event, which may be a festival or sports matches. It recognizes the date specified by the information on the specific date and, at the same time, the classification ID number that corresponds to the information on the event. Techniques that can be used to recognize the classification ID number include the following. It may determine the date classification from the event information that is specified and input by the user and recognize the classification ID number from the determined date classification. If, for example, the event information relates to sports matches that take place in Athletic Ground B, it determines that the date classification to be "special day 2" and then recognizes the classification ID number to be "ID5" from the "special day 2". If the event information relates to the last day of five consecutive holidays, it recognizes the date classification to be "the last day of a long holiday" and the classification ID number to be "ID10" from the "last day of a long holiday". Then, it appropriately updates the calendar templates 20 on the basis of the date and the classification ID number it recognizes.

The timer 191 recognizes the current clock time typically from GPS on the basis of the reference pulse of an internal clock. Then, the timer 191 appropriately outputs clock time information on the current clock time it recognizes.

[Operation of the Navigation Device]

Now, the operation of the navigation device 100 will be described by referring to the drawings.

(Calendar Template Modifying Process)

Figure 7:
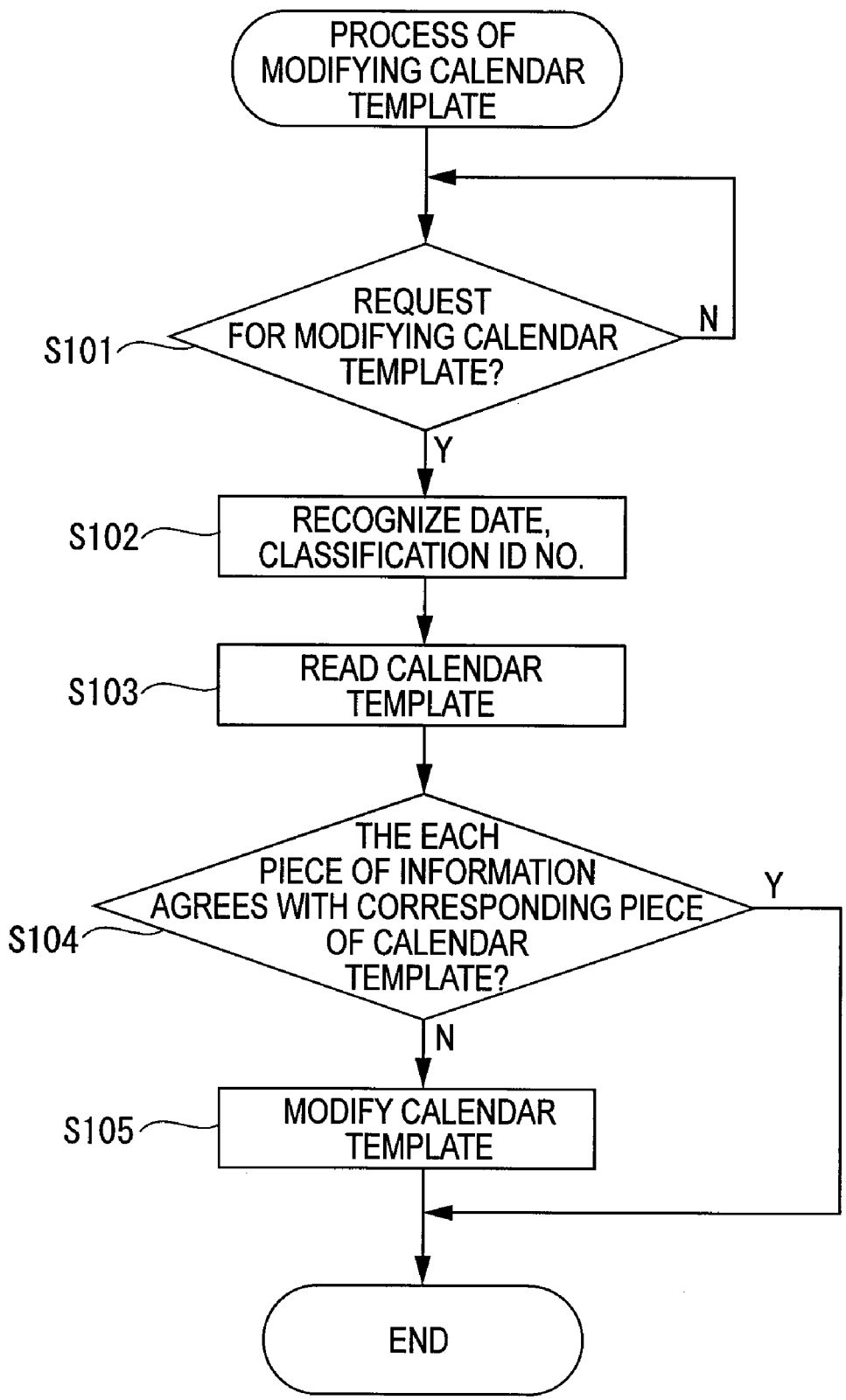
FIG. 7 is a flow chart of the operation of modifying a calendar template of the first embodiment.

Firstly, the calendar template 20 modifying process will be described by referring to FIGS. 7 and 8 as an operation of the navigation device 100. Assume here that the user modifies a calendar template 20 as shown in FIG. 5 on the basis of the information he or she recognized from radio and/or TV broadcastings, printed information sources such as newspapers and/or official publications and/or acquired by connecting his or her mobile phone to the mobile phone line, telling that a festival will be held on 5th in City A. FIG. 7 is a flow chart of the operation of modifying a calendar template and FIG. 8 is a schematic conceptual illustration of the table structure of data in a calendar template as updated by the calendar modifying section.

Firstly, the user of the vehicle turns on the power source of the navigation device 100 to feed power to the device. As power is supplied to the device, the processor 180 controls the terminal display 140 and causes it to display a main menu and prompt the user to specify and input a specific operation of the navigation device 100.

Then, as shown in FIG. 7, the user operates the terminal input section 130 to specify an operation of modifying the calendar template 20. As the processor 180 recognizes by the calendar modifying section 190 the input specifying an operation of modifying the calendar template 20 (Step 101), it has the terminal display 140 display an image that prompts the user to specify and input a date and an event necessary for modifying the calendar template 20.

Thereafter, as the user specifies and inputs a date and an event that also function as modification request by operating the terminal input section 130, following the instructions in the displayed image, the calendar modifying section 190 acquires the date and the event specified and input by the user. The user may specify and input a date and an event by entering characters or selecting them from a number of candidates being displayed on the terminal display 140. Alternatively, the user may specify and input a date and an event in a manner as described below. Firstly, the user selects a date by operating the terminal input section 130 and moving the flashing cursor being displayed in or around the area of a date in the calendar template 20 as shown in FIG. 5. Then, he or she inputs the event of the selected date by entering characters or by selecting one of the events being displayed on the terminal display 140.

As the calendar modifying section 190 acquires the date and the event, it operates to recognize the obtained information (Step S102). More specifically, it recognizes the specified date and the classification ID number that corresponds to the event. In the above-described instance, the calendar modifying section 190 recognizes that the date is 5th and determines that the date classification that corresponds to the event is "special day 1" relating to a festival day of City A. Subsequently, it recognizes the classification ID number as "ID4" from the date classification it determined.

Thereafter, it reads out the calendar template 20 stored in the memory 170 (Step S103). Then, the calendar modifying section 190 determines if the information it recognizes in the Step S102 agree with the information contained in the calendar template 20 that is read out in the Step S103 or not (Step S104). More specifically, it recognizes the classification ID number that corresponds to the date it recognizes in the Step S102 from the read out calendar template 20. Then, it determines if the classification ID number recognized from the calendar template 20 and the classification ID number recognized in the Step S102 agree with each other or not.

If the calendar modifying section 190 determines in the Step S104 that the two classification ID numbers agree with each other. It does not modify the calendar template 20 and terminates the processing operation. If, on the other hand, it determines that the two classification ID numbers do not agree with each other, it modifies the calendar template 20 on the basis of the various pieces of information it recognized in the Step S102 (Step S105) and terminates the processing operation. More specifically, since the classification ID number of the 5th as recognized in the Step S102 is "ID4" and the classification ID number of the 5th as recognized from the calendar template 20 is "ID1", the calendar modifying section 190 modifies the classification ID number of the 5th from "ID1" to "ID4" and terminates the processing operation as shown in FIG. 8.

(Process of Searching for the Traveling Route)

Figure 9:
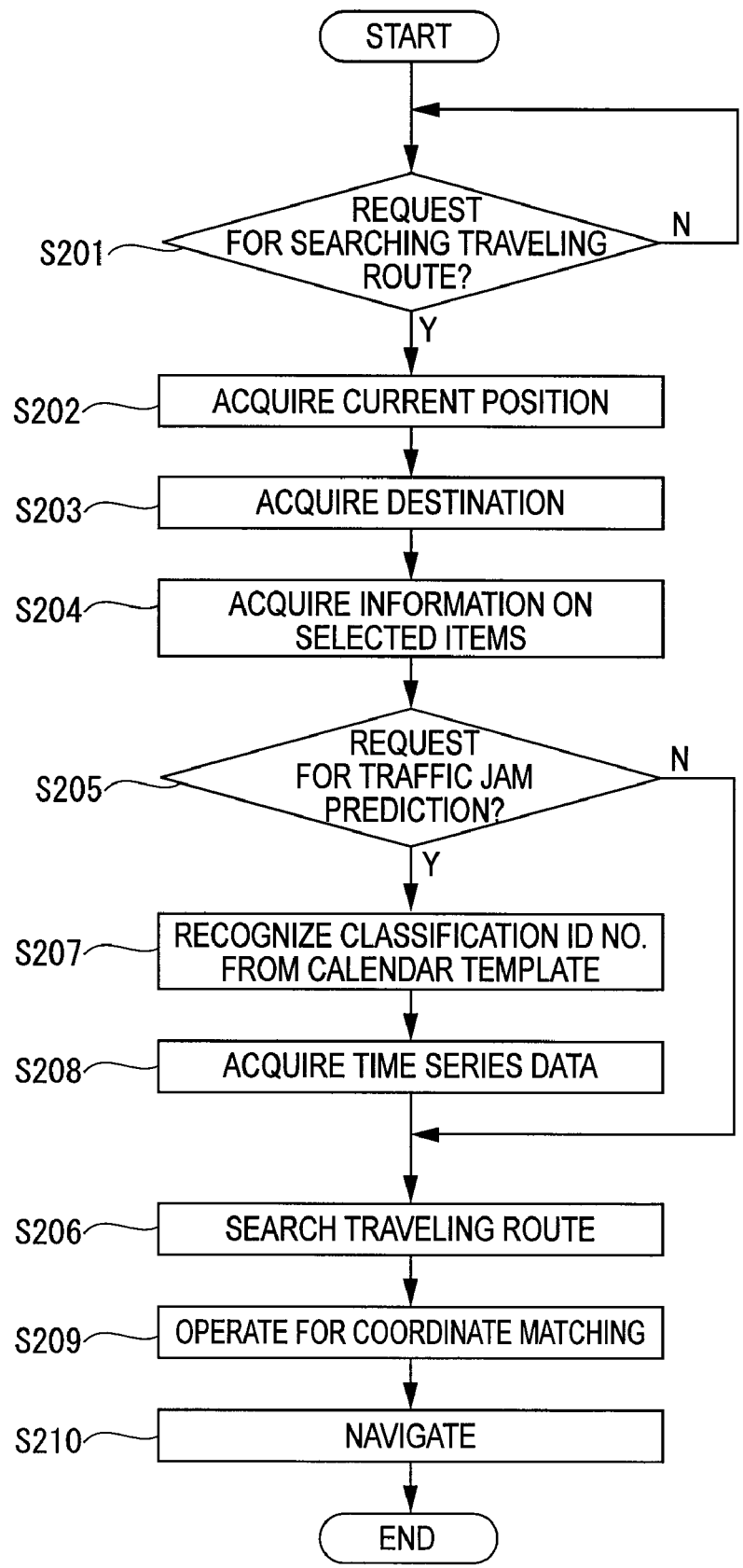
FIG. 9 is a flow chart of the operation of searching for a traveling route of the first embodiment.

Now, the process of searching for the traveling route of the navigation device 100 will be described by referring to FIG. 9 and FIGS. 10A, 10B and 10C. FIG. 9 is a flow chart of the operation of searching for a traveling route of the navigation device. FIGS. 10A, 10B and 10C are schematic illustrations of images of a traveling route that can be displayed on the screen. FIG. 10A is a schematic illustration of an image that can be displayed when the embodiment searches for a traveling route to a selected point. FIG. 10B is a schematic illustration of an image that can be displayed when the embodiment re-searches for a traveling route to the point when a predetermined time period has elapsed from FIG. 10A. FIG. 10C is a schematic illustration of an image that can be displayed when the embodiment re-searches for a traveling route to the point when a predetermined time period has elapsed from FIG. 10B.

Firstly, the user operates the terminal input section 130 to input a command for searching the traveling route of the vehicle as shown in FIG. 9. As the processor 180 recognizes the input of the command for searching the traveling route of the vehicle (Step S201), the processor 180 causes the terminal display 140 to display an image prompting the user to enter various pieces of information necessary for searching the traveling route such as the destination, the shortest traveling distance, the shortest traveling time and necessity of predicting traffic jams.

Then, as the processor 180 recognizes the various pieces of information necessary for searching the traveling route, it has the current position recognizer 181 recognize the current position of the vehicle (Step S202) and the destination recognizer 182 recognize the specified and input destination (Step S203). More specifically, it acquires information on the current position of the vehicle by computationally determining the current position of the vehicle on the basis of the speed data and the azimuth data output respectively from the speed sensor and the azimuth sensor of the sensor 110 and the GPS data on the current position output from the GPS receiver by way of the current position recognizer 181. The acquired information on the current position is appropriately stored in the memory 170.

The processor 180 also controls the terminal display 140 to have it display an image that prompts the user to select and input the destination by operating the terminal input section 130. As the user inputs the destination in response to the prompt of the image, operating the terminal input section 130, the destination recognizer 182 acquires the information on the destination as input by the user. The acquired information on the destination is stored appropriately in the memory 170.

If the user requests to acquire information on the spot of the destination when inputting the destination by operating the terminal input section 130, he or she operates the terminal input section 130 following the prompt of the image being displayed on the terminal display 140 to request retrieval information on the spot. In response to the request for retrieval information on the spot, the processor 180 hierarchically retrieves the mesh information of the lower layers for each area, typically using the map information MP and acquires the retrieval information correlated to the spot of the destination from the storage section 160. Then, the processor 180 controls the terminal display 140 to have it display the acquired retrieval information.

If the retrieval information requires to display map information of a predetermined area containing the destination or the user who recognizes the retrieval information operates the terminal input section 130 to display a predetermined area, the processor 180 appropriately controls the terminal display 140 so as to have it display the display mesh information VMx of the corresponding area. As the desired map information is displayed on the terminal display 140 in this way, the user identifies the destination by appropriately selecting and inputting the spot of the destination by the terminal input section 130, for example, by operating the cursor being displayed on the map image. As the spot is identified, the destination recognizer 182 of the processor 180 recognizes the spot of the destination and appropriately stores it in the memory 170.

Further, the processor 180 controls the terminal display 140 so as to have it display an image that prompt the user to select items that are requirements to be met when searching for the traveling route and input the selected items. As the user operates the terminal input section 130 to select and input the items in response to the prompt of the image being displayed, the processor 180 acquires information on the selected and input items (Step S204). The acquired information on the selected items is appropriately stored in the memory 170.

Thereafter, the processor 180 acquires the information on the selected items stored in the memory 170 by the route processor 188 and determines if the information on the selected items it acquires contains a request for prediction of traffic jams or not (Step S205).

If the processor 180 determines in the Step S205 by the route processor 188 that no request for prediction of traffic jams is contained, it acquires the VICS data output from the VICS receiver 120 by the traffic jam condition recognizer 187. Then, the processor 180 generates current traffic jam information of an area containing the current position and the destination from the obtained VICS data. The generated current traffic jam information is appropriately stored in the memory 170.

Then, the processor 180 has the route processor 188 acquire the current position, the destination, the selected items and the current traffic jam information from the memory 170. Then, it performs a route searching processing operation of searching for the traveling route of the vehicle from the current position to the destination, using the map information for searching the traveling route of the vehicle and the matching data MM stored in the storage section 160 (Step S206).

More specifically, when the moving route involves only major roads for which sufficient data are accumulated in an organized manner, the processor 180 searches the moving route, simply using the map information for searching the traveling route of the vehicle. When, on the other hand, the moving route involves minor and narrow roads for which sufficient data are not accumulated, it searches the moving route, using the matching data MM for the minor road or each of the minor roads, until the minor road gets to a major road. When searching for the moving route, using the matching data MM, the processor 180 recognizes the condition of each of the roads on the basis of the related link L, determining if there are two nodes N that represent the same and identical spot or not by the coordinate matching section 186.

Then, the route processor 188 detects a plurality of candidate traveling routes and narrows them down to a fewer number of candidate traveling routes to generate traveling route information on, for example, five candidate traveling routes that meet the requirements provided by the user on the basis of the acquired information of the selected items and the current traffic jam information. The route processor 188 further determines the traveling time necessary for each of the candidate traveling routes of the moving route information to get to the destination and generates traveling time information. Then, the display controller 184 has the terminal display 140 display the computationally obtained five candidate traveling routes and prompt the user to select one of them. The traveling route of the vehicle is defined as the user (driver) selects one of the candidate traveling routes.

If, on the other hand, the processor 180 determines in the Step S205 by the route processor 188 that a request for prediction of traffic jams is contained, it acquires the clock time from the timer 191 and recognizes the current date from the acquired clock time. Then, it acquires the related calendar template 20 from the memory 170 and recognizes the classification ID number of the date it recognizes from the acquired calendar template 20 (Step S207). It also acquires information on the current position and the destination stored in the memory 170 and recognizes the current position and the destination. Then, the traffic jam condition recognizer 187 acquires the time series data 12i that corresponds to the recognized classification ID number and contains the current position and the destination from the traffic jam prediction table 10 stored in the storage section 160 (Step S208).

Thereafter, the processor 180 performs the processing operation of the Step S206. More specifically, the processor 180 generates current traffic jam information by the traffic jam condition recognizer 187 and stores it in the memory 170. Then, the processor 180 acquires information on the current position, the destination and the selected items from the memory 170 by the route processor 188. Then, it detects a plurality of candidate traveling routes on the basis of the acquired information and narrows them down to a fewer number of candidate traveling routes on the basis of the acquired information on the selected items to generate information on the candidate traveling routes that meet the requirements of the user.

Further, the processor 180 acquires the current traffic jam information from the memory 170 by the traffic jam condition recognizer 187 and the current time and day from the timer 191. Then, the traffic jam condition recognizer 187 determines the expected arrival time of getting to a selected point on each of the candidate traveling routes contained in the information on the candidate traveling routes generated by the route processor 188 on the basis of the current traffic jam information and the current time and day it acquires. Then, the traffic jam condition recognizer 187 predicts the traffic jam on each of the candidate traveling routes at the expected arrival time of getting to the selected point on the basis of the time series data 12i acquired in the Step S208 and generates traffic jam prediction information on the condition of each of the predicted traffic jams.

Then, the processor 180 narrows down the candidate traveling routes in the candidate traveling route information to a fewer number of candidate traveling routes, e.g., five candidate traveling routes, by the route processor 188 on the basis of the current traffic jam information and the traffic jam prediction information. Then, the route processor 188 determines the traveling time necessary for getting to the destination by each of the candidate traveling routes in the traveling route information to generate traveling time information. Then, the processor 180 operates the display controller 184 so as to have the terminal display 140 display the information on the computationally determined five candidate traveling routes and also an image prompting the user to select one of the candidate traveling routes. The traveling route is defined when the user selects one of the candidate traveling routes.

Thereafter, the processor 180 acquires matching data MM from the storage section 160. Then, it has the coordinate matching section 186 perform a coordinate matching processing operation on the acquired matching data MM (Step S210) and recognizes the condition of the roads of the selected traveling route or how the roads are connected. Then, it appropriately stores the condition of the roads in the memory 170. Further, the processor 180 controls the terminal display 140 by the display controller 184 so as to have it superimpose an icon that indicates the current position of the vehicle on the acquired map information on the basis of the information on the current position and also the traveling route selected by the user, the traffic jam prediction information, the expected traveling time and the current traffic jam information.

Assume here that the processing operations of the Steps S201 through S210 are performed and no traffic jam takes place currently on the roads that connect the current position S1 and the destination G with the shortest distance, while no traffic jam is predicted at any position on the traveling route for getting to the destination G. In such a situation, the traveling route K1 is superimposed on the roads R11, R12 and R13 that connect the current position S1 and the destination G with the shortest distance on the basis of the traveling route information and the traveling time marks Nt are superimposed at respective positions near the current position S1 and near the destination G on the basis of the traveling time information as shown in the guidance display image 30A of FIG. 10A. It will be appreciated that an image as shown in FIG. 10A is displayed when the processing operations of the Steps S201 through S206 and S209 are performed and no traffic jam is currently taking place on the roads that connect the current position S1 and the destination G with the shortest distance. The traveling time marks Nt as shown in FIG. 10A indicate that the traveling time to the destination G is one hour and thirty minutes.

Subsequently, the processor 180 recognizes the running condition of the vehicle on the basis of the data output from the speed sensor, the azimuth sensor and the acceleration sensor of the sensor 110 and the GPS data output from the GPS receiver. Further, the processor 180 has the guidance providing section 183 to notify the user of guidance information for guiding the travel of the vehicle that is provided on the basis of the recognized moving condition of the vehicle, and the route guidance information contained in the traveling route information. The guidance information is provided to the user by way of the terminal display and/or in voice (Step S210).

More specifically, the display controller 184 of the processor 180 connects the nodes N in the matching mesh information MMx acquired from the storage section 160 by a poly-line and performs a poly-line processing operation on the basis of the structure of each of the roads as described in the link string block information of the matching data MM so as to have the terminal display 140 display the roads in the area of the matching mesh information MMx that contains the traveling route. Further, the display controller 184 has the terminal display 140 superimpose the name information VMxA and the background information VMxC that are miscellaneous elemental data of the map other than the roads in the area that corresponds to the matching mesh information MMx of the display mesh information VMx acquired from the storage section 160. Then, the current position of the vehicle is superimposed on the map that is being displayed.

When superimposing the current position on the map, a map matching processing operation is performed on the basis of the matching data MM so that the current position of the vehicle as indicated by a mark that is superimposed on the map being displayed on the terminal display 140 may not be displaced from the road in the displayed map. In other words, the processor 180 appropriately corrects the current position information in such a way that the current position of the vehicle as displayed on the terminal display 140 is found on the matching data MM of the traveling route and hence on the link string of links L. Thus, the processor 180 superimposes the current position of the vehicle on the map to guide the user. When the current position gets to the predetermined position, it provides guidance in the above-described manner by displaying it and/or in voice. While a coordinate matching processing operation is performed at the time of acquiring the matching data MM in the Step S209 in the above description, the coordinate matching processing operation may alternatively be performed at the time of or before performing the map matching processing operation.

When the terminal input section 130 is operated to display a map of an area other than the above area for viewing, the map will be displayed by way of a retrieval operation as described above along with the display mesh information VMx acquired from the storage section 160.

While the vehicle is moving, the processor 180 acquires VICS data on traffic jams, traffic accidents, road construction works, traffic control operations and meteorological information by way of the traffic jam condition recognizer 187. Then, if the moving condition of the vehicle can be influenced and it can be forced to alter the traveling route according to the VICS data and the meteorological information acquired by way of the traffic jam condition recognizer 187, the processor 180 repeats the processing operation of searching for the traveling route. In other words, the processor 180 performs a rerouting processing operation. Further, the processor 180 notifies the user of the influence or provides the user with guidance that reflects the influence by the guidance providing section 183.

Assume here now that the traffic jam condition recognizer 187 recognizes that a traffic jam is taking place on the road R12 as a result of the processing operations of the Steps S201 through S209 but no traffic jam is predicted to take place at the selected point on the way to get to the destination G. Then, in such a situation, the traveling route K2 is superimposed on the roads R11, R14 and R15 on the basis of the traveling route information and the traveling time marks Nt are superimposed on the map at respective positions near the current position S2 and near the destination G on the basis of the traveling time information, while the current traffic jam mark Jg is superimposed at a position near the road R12 on the basis of the current traffic jam information as shown in the guidance display image 30B of FIG. 10B. An hour, or "1:00", is displayed for the traveling time from the current position S2 to the destination G. It will be appreciated that an image as shown in FIG. 10B is displayed when the processing operations of the Steps S201 through S206 and S210 are performed and a traffic jam is currently taking place on the roads R12.

Assume now that subsequently the processing operations of the Steps S201 through S209 are performed and the traffic jam condition recognizer 187 recognizes that the traffic jam on the road R12 is not dissolved yet, while it is predicted that a traffic jam will occur on the road R13 before the vehicle gets to the destination G. In such a situation, the traveling route K3 is superimposed on the roads R14, R16, R17 and R18 on the basis of the traveling route information and the predicted traffic jam mark Jy is superimposed near the road R13 on the basis of the traffic jam prediction information, while the traveling time marks Nt are superimposed on the map at respective positions near the current position S3 and near the destination G on the basis of the traveling time information, while the current traffic jam mark Jg is superimposed at a position near the road R12 on the basis of the current traffic jam information as shown in the guidance display image 30C of FIG. 10C. Forty minutes, or "0:40", is displayed for the traveling time from the current position S3 to the destination G.

ADVANTAGES OF THE FIRST EMBODIMENT

As described above in detail, with the first embodiment, a traffic jam prediction table 10 that contains a plurality of records, each including date classification IDs 11 indicating the classifications of dates and days of the week and time series data 12i relating to traffic conditions and obtained by statistically processing VICS data for any day of the week and any date in the past that can be identified by a date classification ID for every 10 minutes is stored in the storage section 160 of the navigation device 100. Further, the memory 170 stores calendar templates 20, each of which contains a plurality of records, each indicating dates information showing dates and classification ID numbers, each of which is same as one of the date classification IDs 11 in the traffic jam prediction table 10 and shows the date classification of any of the dates. Then, the navigation device 100 drives the calendar modifying section 190 to appropriately modify the classification ID number of any selected date of any of the calendar templates 20. Further, when the navigation device 100 acquires selected time series data 12i by the traffic jam condition recognizer 187, it retrieves the classification ID number of the recognized date from the related calendar template 20 and recognizes it. Then, it retrieves the date classification ID number 11 same as the classification ID number it recognizes from the traffic jam prediction table 10 and acquires the time series data 12i of a selected date from the record of the date classification ID number 11.

In this way, the navigation device 100 drives the calendar modifying section 190 to appropriately modify the classification ID number of a selected date of the calendar template 20 to be used for acquiring the time series data 12i by the traffic jam condition recognizer 187. Thus, it is possible to appropriately and easily modify time series data 12i correlated to a selected date with the simple arrangement of modifying only the classification ID number of the selected date of the calendar template 20. Since the date information and the classification ID numbers of a calendar template 20 generally involve only a small amount of data if compared with the time series data 12i, the operation of modifying the calendar template 20 can be performed easily. Therefore, it is possible to provide a navigation device 100 that can easily and appropriately utilize traffic information on past traffic conditions. Further, the arrangement and the process for conveniently utilize traffic information can be simplified because the time series data 12i are acquired by using a calendar template 20 that contains date information and classification ID numbers that involve only a small amount of data.

The navigation device 100 is provided with a plurality of calendar templates 20 that contain the date information of a year like a calendar. With the use of calendar templates 20, classification ID numbers can be allocated to the dates of a year without difficulty. With this arrangement, any of the calendar templates 20 can be modified by a simple operation.

The navigation device 100 is provided with a timer 191 that tells the current time and date. As the navigation device 100 recognizes a traffic jam prediction request, requesting acquisition of traffic conditions of a selected date in the past, it drives the traffic jam condition recognizer 187 to recognize the current date from the timer 191. Then, it retrieves and identifies the record of the date it recognizes from the related calendar template 20 and then recognizes the classification ID number of the date from the identified record. Subsequently, the traffic jam condition recognizer 187 retrieves and identifies the record having the date classification ID 11 same as that of the classification ID number it recognizes from the traffic jam prediction table 10 stored in the storage section 160 and acquires the time series data 12i, which include information on past traffic conditions from the identified record.

As described above, when acquiring the time series data 12i of a selected date, the navigation device 100 recognizes the current date from the timer 191 and acquires the time series data 12i from the traffic jam prediction table 10 on the basis of the date it recognizes. Therefore, it is not necessary to take in information on the current date into the traffic jam prediction request and hence the traffic jam prediction request can be generated with ease.

Time series data 12i are data relating to past traffic conditions of a selected location. As the navigation device 100 recognizes a traffic jam prediction request, it drives the traffic jam condition recognizer 187 to acquire information on the current position and the destination and then recognizes the current position and the destination from the acquired pieces of information. Thereafter, it retrieves and acquires the time series data 12i that are correlated to the current date and provide information on the geographical area that includes the current position and the destination.

Since time series data 12i are data relating to past traffic conditions of a selected location, it is possible to reduce the volume of information of each set of time series data 12i. Further, since the navigation device 100 recognizes the current position and the destination and acquires the time series data 12i of a geographical area that includes the current position and the destination, the information to be acquired can be minimized. Therefore, it is possible to carry out the process of acquiring the time series data 12i easily and quickly.

The traffic jam prediction table 10 contains time series data 12i relating to past traffic conditions of a specific date. In other words, the navigation device 100 can acquire information on traffic conditions in the past of a specific date that is not defined simply by a day of the week and a calendar date and hence can find a broad scope of application.

The traffic jam prediction table 10 contains time series data 12i relating to the dates when festivals and sports events were held in the past and also to the day before, the first day, the middle day, the last day and the day before the last day of a long holiday that is longer than three consecutive days. Thus, it is possible to acquire information on past traffic conditions of on each of such days when the traffic condition can be different from that of ordinary days. Therefore, the navigation device 100 can find a broad scope of application.

The traffic jam condition recognizer 187 is provided with a functional feature of, for example, generating traffic jam predictions on the traffic jams that can take place at locations on the way to the destination by using the acquired time series data 12i. Therefore, the navigation device 100 can predict any traffic jams that can take place on the way along which the vehicle is traveling. Therefore, the navigation device 100 can find a broad scope of application. Further, it predicts traffic jams by using the time series data 12i on past traffic conditions on any day of the week and on any calendar date. Thus, the navigation device 100 can provide highly reliable traffic jam predictions.

The navigation device 100 has a route processor 188 and a display controller 184. The route processor 188 searches for the traveling route on the basis of information on the current position, information on the destination and information on the traffic predictions generated on the basis of time series data 12i and generates information on the searched traveling route. The display controller 184 has the terminal display 140 display the traveling route generated by the route processor 188 in order to notify the traveling route to the user.

More specifically, the navigation device 100 drives the route processor 188 to search for the traveling route, taking the generated traffic jam predictions into consideration, and notifies the user of the traveling route by using the terminal display 140. Therefore, the navigation device 100 can provide the most appropriate traveling route that meets the requirements of the user, which may include the minimum traveling time and/or the minimum traveling distance and notifies it to the user. Thus, the navigation device 100 can find a broad scope of application.

The navigation device 100 has a memory 170 for storing calendar templates 20. The calendar modifying section 190 has a function of acquiring information on a date and an event and a function of recognizing a classification ID number from the acquired event information. Then, the navigation device 100 drives the calendar modifying section 190 to identify the record of the calendar template 20 stored in the memory 170 on the basis of the acquired date information and modifies the classification ID number of the identified record to the recognized classification ID number.

As the navigation device 100 has the memory 170 that stores calendar templates 20, it can quickly identify the record of a calendar template 20 by the calendar modifying section 190. Then, it can quickly modify the calendar template 20.

When modifying the classification ID number of a selected date of a calendar template 20, the calendar modifying section 190 determines if the classification ID number of the record of the related calendar template 20 identified from the selected and input date and the classification ID number recognized from the selected and input event agree with each other or not. If it is determined that the two classification ID numbers do not agree with each other, the calendar modifying section 190 modifies the classification ID number of the record of the calendar template 20 identified from the selected and input date to the classification ID number recognized from the selected and input event. If, on the other hand, it is determined that the two classification ID numbers agree with each other, the calendar modifying section 190 does not modify the classification ID number of the recorded of the calendar template 20.

With this arrangement, it is possible to reduce the number of times of processing operations by one when the classification ID number of the recorded of the calendar template 20 identified from the selected and input date and the classification ID number recognized from the selected and input event agree with each other. Therefore, the operation of modifying the calendar template 20 can be performed appropriately and quickly.

The navigation device 100 has a terminal input section 130 by way of which the user can select and input a date and/or an event. The calendar modifying section 190 recognizes the classification ID number of the event that is selected and input by the terminal input section 130. Then, it retrieves and identifies the record of the date as selected and identified from the calendar template 20 and modifies the classification ID number of the identified record to the classification ID number recognized from the selected and input event.

In this way, the classification ID number of any date of the calendar templates 20 can be modified by way of an input operation, using the terminal input section 130. Therefore, the calendar templates 20 can be easily modified whenever the user wants to do so. Thus, if the user recognizes an event that is not reflected to the calendar templates 20 from radio or television broadcasting, he or she can modify the classification ID number of the related calendar template 20 simply by operating the terminal input section 130. Then, the navigation device 100 can appropriately acquire information on the past traffic conditions to which the event is responsible from the calendar template 20 in which the classification ID number is modified. Therefore, the navigation device 100 can acquire information on the past traffic conditions of any selected date.

The calendar modifying section 190 determines if the user operates the terminal input section 130 for the purpose of modifying any of the calendar templates 20 or not and, if it determines that the terminal input section 130 is operated for that purpose, it performs a processing operation for modifying the calendar template 20. With this arrangement, the user can appropriately modify any of the calendar templates 20 by an input operation using the terminal input section 130 according to his or her will. Thus, the navigation device 100 can quickly and appropriately respond to the intension of the user and hence can find a broad scope of application.

Second Embodiment

Now, the second embodiment of the present invention will be described by referring to the related drawings. This embodiment of information processing system is a telecommunication type navigation system for navigating the driver of a moving body, such as a vehicle for example, in response to the moving condition thereof. However, it should be noted that the information processing device according to the present invention is not necessarily arranged in a vehicle, but also can be, like the first embodiment, arranged in any moving body in order to notify the driver of the moving body of the traffic condition thereof.

Figure 11:
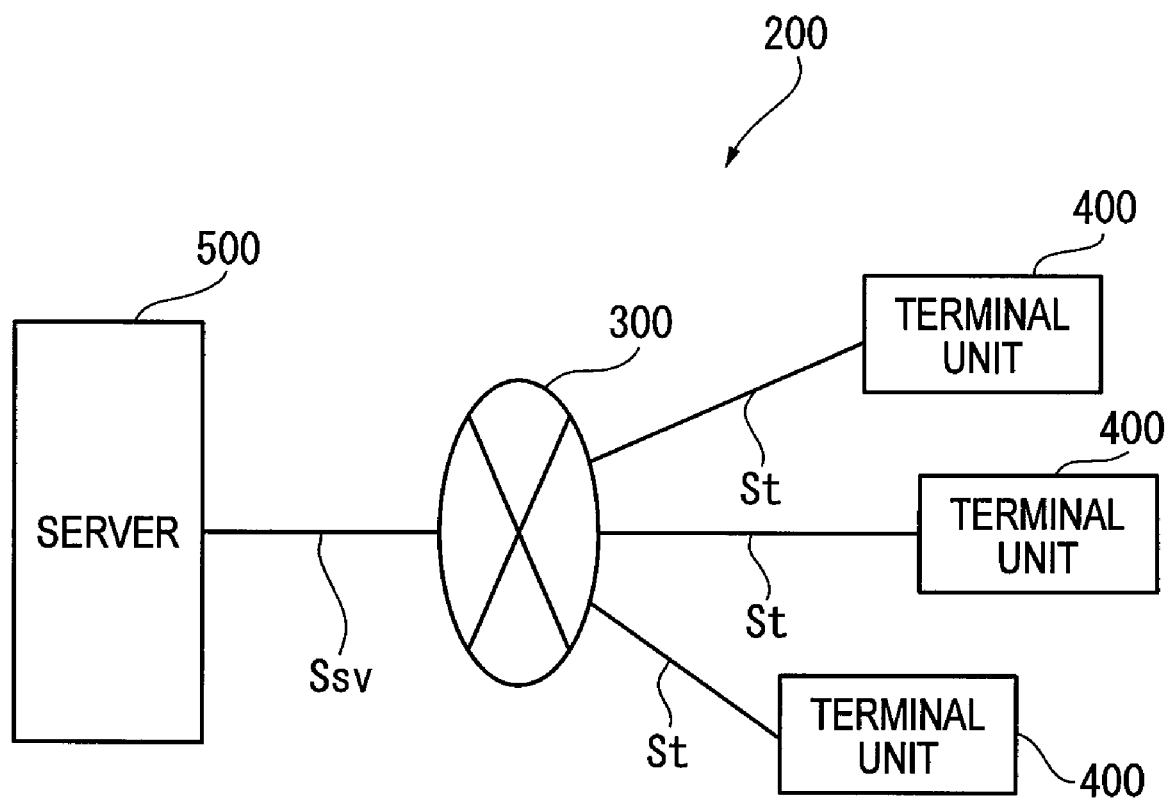
FIG. 11 is a schematic block diagram of a second embodiment of a navigation system according to the present invention, showing the configuration thereof.
Figure 12:
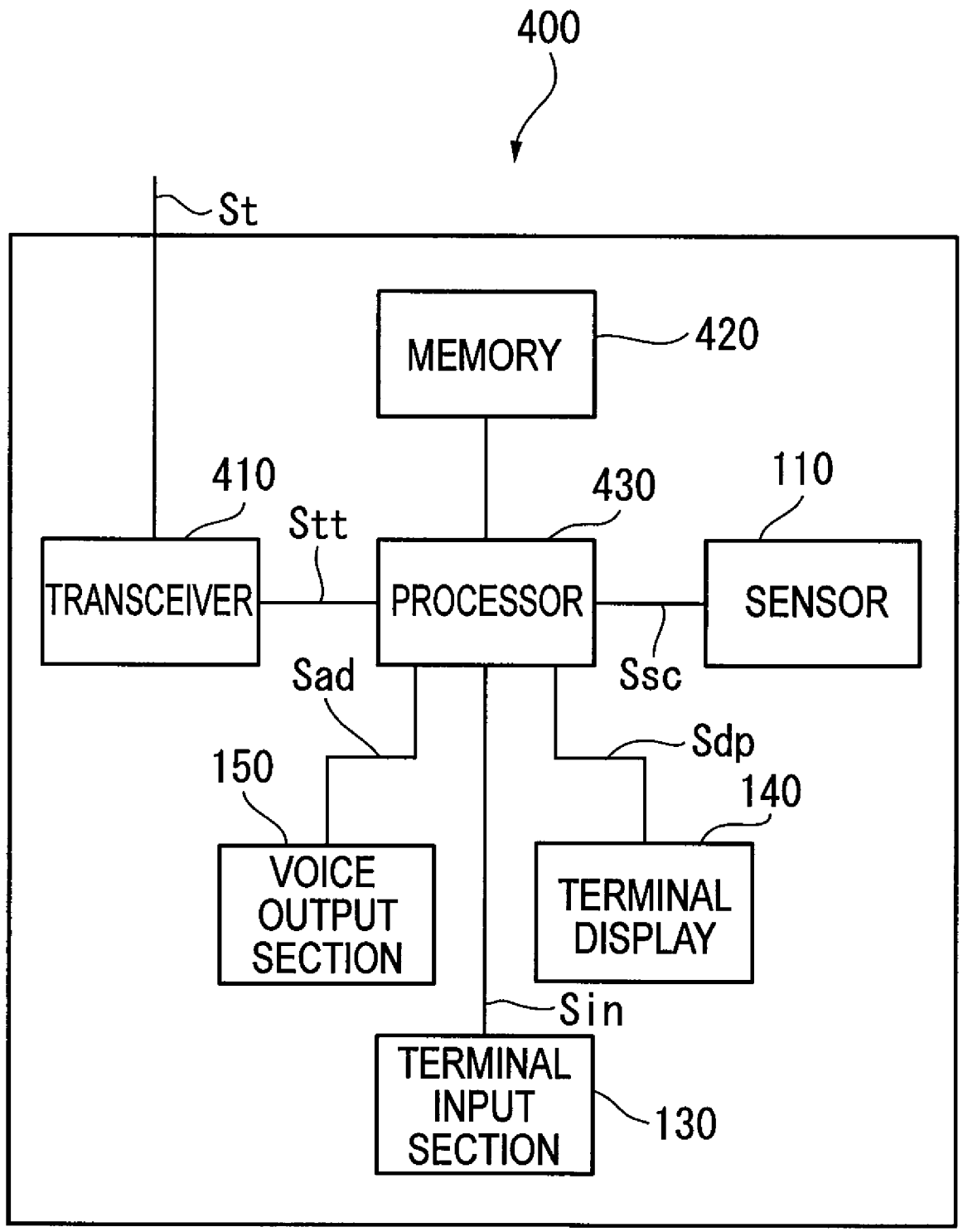
FIG. 12 is a schematic block diagram of a terminal unit of the second embodiment.
Figure 13:
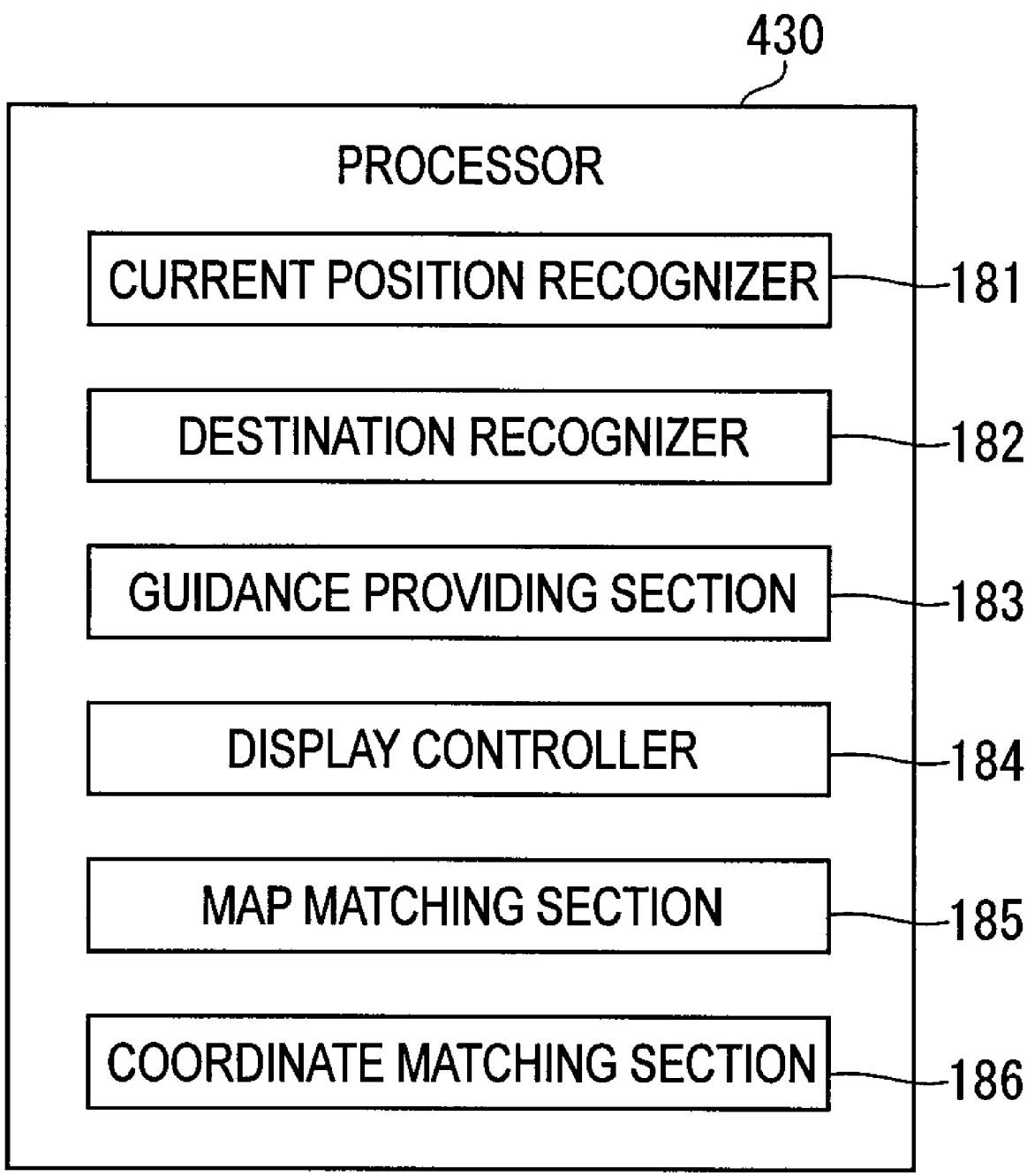
FIG. 13 is a schematic block diagram of the processor of a terminal unit of the second embodiment.
Figure 14:
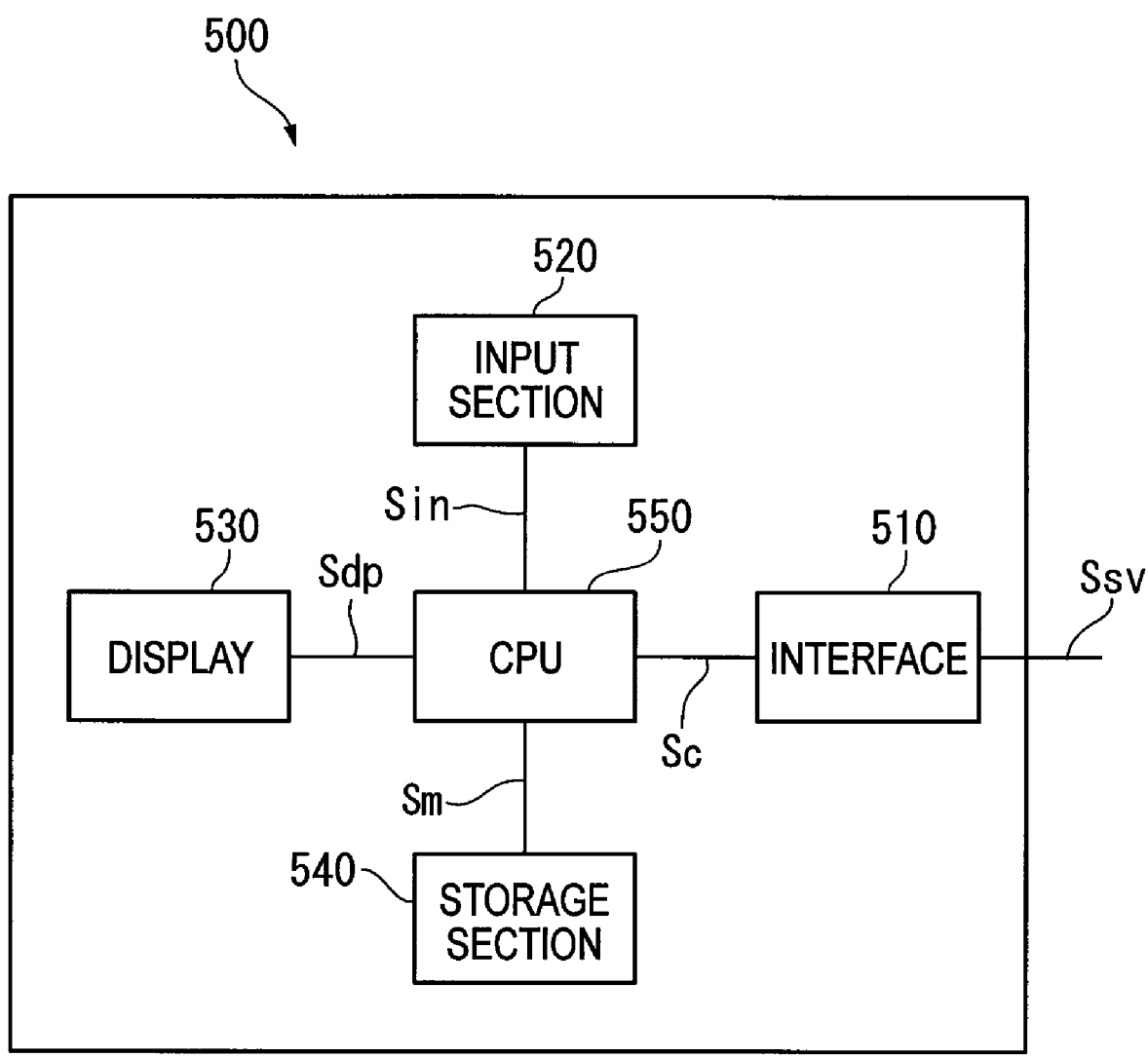
FIG. 14 is a schematic block diagram of the server of the second embodiment.
Figure 15:
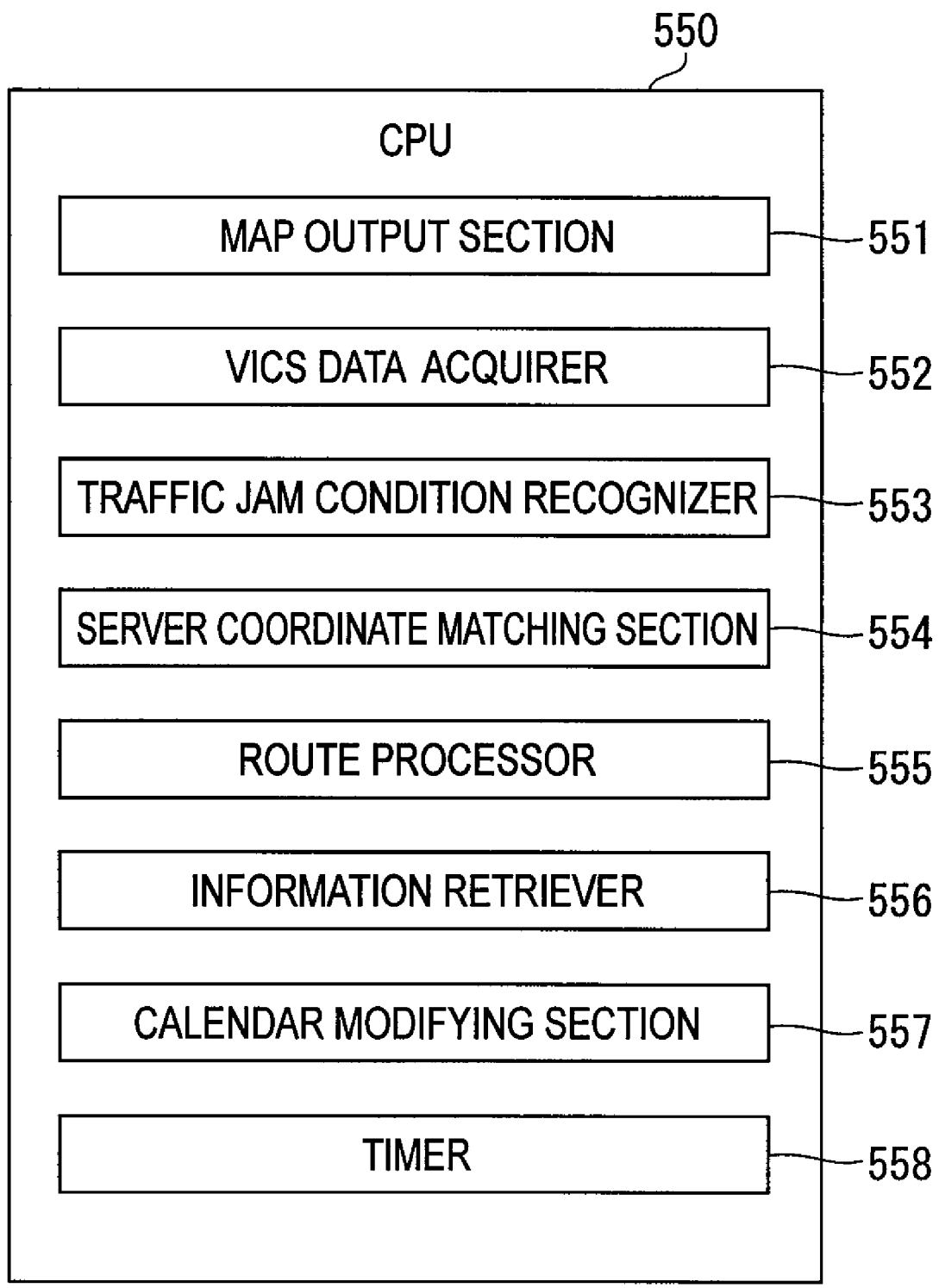
FIG. 15 is a schematic block diagram of the CPU of the server of the second embodiment.

FIG. 11 is a schematic block diagram of the second embodiment of navigation system according to the present invention, showing the configuration thereof. FIG. 12 is a schematic block diagram of a terminal unit. FIG. 13 is a schematic block diagram of the processor of a terminal unit. FIG. 14 is a schematic block diagram of the server. FIG. 15 is a schematic block diagram of the CPU of the server. The components same as those of the first embodiment are denoted respectively by the same reference symbols with no description or only with brief description.

[Configuration of Navigation System]

In FIG. 11, reference symbol 200 denotes a telecommunication type navigation system that is an information processing system. The navigation system 200 is adapted to navigate the user of the vehicle, as a moving body, in response to the moving condition of the vehicle. However, for the purpose of the present invention, a moving body is not limited to a vehicle and may alternatively be an aircraft or a ship. The navigation system 200 includes a network 300, terminal units 400, and a server 500 that operates as information processing device.

The network 300 is connected to the terminal units 400 and the server 500. The network 300 is adapted to connect the terminal units 400 and the server 500 so that they can exchange information with each other. Examples of networks that can be used for the network 300 include the Internet adapted to operate on the basis of a general purpose protocol such as TCP/IP, intranets, LANs (local area networks), networks formed by a plurality of base stations that can exchange information via wireless mediums such as telecommunication networks and broadcasting networks and wireless mediums per se that can be used for the terminal units 400 and the server 500 to directly exchange information. For the purpose of the present invention, wireless mediums include electric waves, light, sound waves and electromagnetic waves.

Like the navigation device 100 of the first embodiment, each of the terminal units 400 may be realized in the form of a vehicle-mounted type device to be mounted in a vehicle, a portable type device, a PDA (personal digital assistant), a portable phone, a PHS (personal handyphone system), a portable personal computer or the like. Each of the terminal units 400 acquires map information delivered from the server 500 via the network 300 and searches for information on the current position and the destination of the vehicle on the basis of the map information it has. It also searches for and displays the route to the destination as well as a predetermined store that is located in the vicinity of the current position of the vehicle so as to operate as landmark along with the services the store provides. As shown in FIG. 12, each of the terminal units 400 includes a transceiver 410, a sensor 110, a terminal input section 130, a terminal display 140 that operates as notifying section, a voice output section 150, a memory 420, a processor 430 and so on. In this embodiment, the terminal input section 130 and the processor 430 operate as terminal modification information generator and request information generator of the present invention.

The transceiver 410 is connected to the server 500 via the network 300 and also to the processor 430. The transceiver 410 is adapted to receive terminal signal St from the server 500 via the network 300 and, upon receiving the terminal signal St, it performs an input interface processing operation that is predefined to acquire a terminal signal St and outputs a processed terminal signal Stt to the processor 430. The transceiver 410 is also adapted to receive a processed terminal signal Stt from the processor 430 and, upon receiving the processed terminal signal Stt, it performs an output interface processing operation that is predefined to transmit it to the server 500 via the network 300 as terminal signal St.

The sensor 110 detects the moving condition of the vehicle on which it is mounted, including the current position and the running condition of the vehicle, and outputs signal Ssc of a predetermined format that represents the moving condition to the processor 430.

The terminal input section 130 typically includes various operation buttons and so on (not shown) to be used by the vehicle user for input operations. The operation buttons are used to specify operations of the terminal unit 400. More specifically, they may be used to execute instructions for telecommunication, requesting to acquire information via the network 300, to specify the type of information to be acquired and/or the requirements to be met for acquiring information, to specify the destination, to retrieve information and to cause the running condition, or the moving condition of the moving body, to be displayed on the terminal display. In response to an operation of the vehicle user, the terminal input section 130 appropriately outputs a predetermined signal Sin to the processor 430 for settings.

The terminal display 140 is controlled by the processor 430 and adapted to display images for signal Sdp from the processor 430. Images that are displayed on the terminal display 140 include map information and images of retrieval information transmitted from the server 500.

The voice output section 150 is controlled by the processor 430 and outputs voices for the purpose of notification for various signals Sad from the processor 430 including those for voice data.

The memory 420 appropriately stores various information acquired via the network 300, which may be information on specified items that are input at the terminal input section 130, music data and/or image data. The memory 420 also stores various programs to be developed on the OS (operating system) of the terminal unit 400 that controls the operation of the entire terminal unit 400. The memory 420 may alternatively include a drive or a driver for readably storing data on a recording medium such as HD (hard disc) or optical disc.

The processor 430 has various input/output ports (not shown) including a telecommunication port connected to the transceiver 410, a GPS reception port connected to a GPS receiver of the sensor 110, sensor ports connected to respective various sensors of the sensor 110, a key input port connected to the terminal input section 130, a display control port connected to the terminal display 140, a voice control port connected to the voice output section 150 and a memory port connected to the memory 420. As shown in FIG. 13, the processor 430 has as various programs a current position recognizer 181, a destination recognizer 182, a guidance providing section 183, a display controller 184, a map matching section 185 and a coordinate matching section 186.

The current position recognizer 181 recognizes the current position of the vehicle. The information acquired by the current position recognizer 181 are appropriately stored in the memory 420.

The destination recognizer 182 typically acquires destination information on the destination of the vehicle as selected and input by the user by operating the terminal input section 130 and recognizes the position of the destination. The destination information recognized by the destination recognizer 182 is appropriately stored in the memory 420.

The guidance providing section 183 provides guidance for driving the vehicle to support the user on the basis of the traveling route information and the feature guidance information acquired in advance in response to the running condition of the vehicle and stored in the memory 420.

The map matching section 185 operates for map matching processing necessary for displaying the current position of the vehicle as recognized by the current position recognizer 181 based on the map information obtained from the server 500.

The coordinate matching section 186 operates for coordinate matching processing necessary for determining if the pieces of information on two nodes N contained in the matching data MM of the map information obtained from the server 500 as spot information indicate the same and identical spot or not.

The server 500 is adapted to exchange information with the terminal units 400 via the network 300. The server 500 is also adapted to acquire various pieces of information from other servers of various governmental administration offices such as Meteorological Agency and Metropolitan Police Department, civil organizations, VICS and enterprises via the network 300. Pieces of information it acquires include meteorological information, VICS data on traffic jams, traffic accidents, road construction works, traffic control operations and so on and shop information on various stores and shops including gas stands and restaurants as well as other information that can be utilized for moving vehicles. As shown in FIG. 14, the server 500 includes an interface 510 that also operates as positional information acquirer and notification controller, an input section 520, a display 530, a storage section 540, a CPU (central processing unit) 550 and so on.

The interface 510 performs a predetermined input interface processing operation on the server signal Ssv input to it via the network 300 and outputs the processed signal to the CPU 550 as processed server signal Sc. Further, as a processed server signal Sc to be transmitted from the CPU 550 to the terminal units 400 is input to it, the interface 510 performs a predetermined output interface processing operation on the processed server signal Sc that is input to it and outputs the processed signal to the terminal units 400 via the network 300 as server signal Ssv. Incidentally, it may also be so arranged that the server signal Ssv is output only to a predetermined terminal unit 400 according to the information contained in the processed server signal Sc.

Like the terminal input section 130, the input section 520 typically includes a keyboard and a mouse as well as various operation buttons and operation knobs (not shown) to be used by the vehicle user for input operations. The operation buttons and the operation knobs are used to specify operations of the server 500, to specify and input information to be stored in the storage section 540 and to update the information stored in the storage section 540. In response to an operation of the vehicle user for specifying and inputting items, the input section 520 outputs a predetermined signal Sin to the CPU 550 to specify and input the items. In addition to or in place of the operation buttons and the operation knobs, the input section 520 may include a touch panel that may be arranged at the display 530 for input operations and a voice input section.

Like the terminal display 140, the display 530 is controlled by the CPU 550 and adapted to display images for signal Sdp from the CPU 550. Images that are displayed on the terminal display 140 include those retrieved from the storage section 540 and those acquired from external servers via the network 300.

The storage section 540 readably stores various pieces of information received from the terminal units 400 and external servers such as map information as shown in FIGS. 2 and 3 and a traffic jam prediction table 10 as shown in FIG. 4. The storage section 540 also readably stores calendar templates 20 correlated to each of the terminal units 400 that are connected to the server 500 via the network 300 as shown in FIG. 5. More specifically, although not shown in figures, the storage section 540 has a various information storage area for storing various pieces of information, a map information storage area for storing map information, a traffic jam prediction table storage area for storing a traffic jam prediction table 10, a calendar storage area for storing calendar templates 20 and the like.

While the storage section 540 has four storage areas in the above description, this embodiment is by no means limited thereto. In other words, the storage section 540 may not have such storage areas or may have additional storage areas. The storage section 540 may include drives or drivers for readably storing data on storage mediums such as HDs (hard discs), DVDs (digital versatile discs), optical discs and memory cards. It is also adapted to store the information input by operating the input section 520 and update the information input by operating the input section 520 and stored in it. The storage section 540 further stores various programs to be developed on the OS (operating system) of the navigation system 200 that controls the operation of the entire server 500 and the entire navigation system 200.

The storage section 540 stores retrieval information necessary for acquiring information on a predetermined spot on a map as map information. More specifically, retrieval information, which correspond to the retrieval request from the terminal units 400, include information on the designations of prefectures, cities, towns, villages, districts and areas that are used to pinpoint a spot, guidance information and information on shops. Retrieval information is stored to show a table structure where pieces of information on items are arranged hierarchically in the form of a tree structure.

The storage section 540 further stores personal information relating to the users of the navigation system 200 who utilize the navigation system 200 by using any of the terminal units 400. Personal information may include the name and the address of each user and the ID number and the password assigned to each user as well as the type of each of the terminal units 400 that is used when utilizing the navigation system 200 and the address number of each of the terminal units 400 that is used for transmitting information to and receiving information from the terminal unit 400. Further, the storage section 540 stores various pieces of information to be used for performing navigation processing operations that are readable to the CPU 550.

As shown in FIG. 15, the CPU 550 has as various programs stored in the storage section 540 a map output section 551, a VICS data acquirer 552, a traffic jam condition recognizer 553 that operates as traffic condition prediction section, condition information acquirer and date classification recognizer, a server coordinate matching section 554, a route processor 555 that operates as route searcher, an information retriever 556, a calendar modifying section 557 that operates as date classification modifier and modification information acquirer, a timer 558 and so on.

The map output section 551 is adapted to respond to information requesting delivery of information relating the map information contained in the processing server signal Sc input to it. Then, it retrieves the requested information from the map information stored in the storage section 540, e.g., display data VM and matching data MM that correspond to a predetermined area, and reads it out as memory signal Sm. Then, it converts the memory signal Sm it reads out into processing server signal Sc and outputs it to selected ones or all of the terminal units 400 via the interface 510 and the network 300 according to the processing server signal Sc so as to deliver the requested information of the map information.

Like the VICS receiver 120 of the first embodiment, the VICS data acquirer 552 acquires VICS data from the VICS (not shown) on the basis of the input processing server signal Sc and according to the information relating to a request for searching the traveling route as contained in the processing server signal Sc.

The traffic jam condition recognizer 553 generates current traffic jam information as memory signal Sm from the VICS data acquired by way of the VICS data acquirer 552 on the basis of the input processing server signal Sc and according to the information relating to a request for searching the traveling route as contained in the processing server signal Sc. Further, like the traffic jam condition recognizer 187 of the first embodiment, the traffic jam condition recognizer 553 of this embodiment performs a processing operation to generate traffic jam prediction information as memory signal Sm on the basis of the input processing server signal Sc and according to the information relating to a request for searching the traveling route, taking the traffic jam information and the predicted traffic jams as contained in the processing server signal Sc into consideration. Then, it appropriately converts the generated memory signal Sm into a processing server signal Sc and outputs it to selected ones or all of the terminal units 400 via the interface 510 and the network 300 according to the processing server signal Sc so as to notify the current traffic jam condition and the predicted traffic jams that will take place to any of the related vehicles that are provided with a terminal unit 400 before the vehicle gets to the destination.

Like the coordinate matching section 186 of each of the above-described terminal units 400, the server coordinate matching section 554 operates for coordinate matching processing necessary for determining if the pieces of information on two nodes N contained in the matching data MM of the map information indicate the same and identical spot or not.

Like the route processor 188 of the first embodiment, the route processor 555 of the second embodiment operates for processing operations and generates information on the traveling route and the traveling time as memory signal Sm on the basis of the input processing server signal Sc and according to the information relating to a request for searching the traveling route as contained in the processing server signal Sc. Then, it appropriately converts the generated memory signal Sme into a processing server signal Sc and outputs it to selected ones or all of the terminal units 400 via the interface 510 and the network 300 according to the processing server signal Sc so as to notify the traveling route and the traveling time to any of the related vehicles that are provided with a terminal unit 400 before the vehicle gets to the destination.

Like the information retriever 189 of the first embodiment, the information retriever 556 of this embodiment hierarchically retrieves the retrieval information stored in the storage section 540 typically on the basis of item information and reads it as memory signal Sm on the basis of the input processing server signal Sc and according to the information relating to a request for searching the traveling route as contained in the processing server signal Sc. Then, it appropriately converts the generated memory signal Sm into a processing server signal Sc and outputs it to selected ones of the terminal units 400 via the interface 510 and the network 300 according to the processing server signal Sc so as to deliver the retrieval information.

The calendar modifying section 557 recognizes various pieces of terminal-specific information including information on a calendar modifying request for modifying any of the calendar templates 20 and information on the ID number for identifying the terminal unit 400 that generates and outputs the calendar modifying request on the basis of the input processing server signal Sc, the pieces of information being contained in the signal Sc. Then, like the calendar modifying section 190 of the first embodiment, the calendar modifying section 557 appropriately updates the calendar templates 20 stored in the storage section 540 and correlated to the terminal unit 400 that is identified by the terminal-specific information stored in the storage section 540 by way of a processing operation.

The timer 558 recognizes the current clock time typically from the reference pulse of an internal clock. Then, the timer 558 appropriately outputs clock time information on the current clock time it recognizes.

The CPU 550 performs computational operations according to the signal Sin input from the input section 520 as a result of an input operation and generates signal Sdp and other signals. Then, it appropriately outputs the generated signals to the display 530, the interface 510 and the storage section 540 to operate them according to the input information.

[Operation of the Navigation System]

Now, the operation of the navigation system 200 will be described by referring to the drawings. However, the processing operations that are substantially the same as those of the first embodiment will be described only briefly.

(Calendar Template Modifying Process)

Firstly, the calendar template 20 modifying process will be described by referring FIG. 16 as an operation of the navigation system 200. Assume here that the user (driver) modifies a calendar template 20 as shown in FIG. 5 and stored in the storage section 540 of the server 500 on the basis of the information he or she recognized typically from radio and/or TV broadcasting, telling that a festival will be held on 5th in City A. FIG. 16 is a flow chart of the operation of modifying a calendar template.

Firstly, the user of the vehicle turns on the power source of the terminal device 400 of the vehicle to feed power to the device. As power is supplied to the device, the processor 430 controls the terminal display 140 and causes it to display a main menu and prompt the user to specify and input a specific operation of the terminal unit 400.

Then, as shown in FIG. 16, the user operates the terminal input section 130 to specify an operation of modifying the calendar templates 20. As the processor 430 recognizes by way of the calendar modifying section 557 the input specifying an operation of modifying the calendar templates 20 (Step 301), it causes the terminal display 140 to display an image that prompt the user to specify and input a date and an event necessary for modifying the calendar templates 20.

Thereafter, as the user specifies and inputs a date and an event by operating the terminal input section 130, following the instructions in the displayed image, the processor 430 recognizes the date and the event. Then, the processor 430 generates a calendar modifying request including the date and the event it recognizes (Step S302) and has the transceiver 410 transmit the generated calendar modifying request to the server 500 via the network 300. When transmitting the calendar modifying request, the processor 430 also transmits the terminal-specific information for identifying the terminal unit 400 in question (Step S303).

As the server 500 receives the calendar modifying request and the terminal-specific information transmitted from the terminal unit 400 (Step S304), it has the calendar modifying section 557 recognize the date and the event included in the received calendar modifying request (Step S305). More specifically, the calendar modifying section 557 recognizes the specified date as 5th, and the classification ID number correlated to the event as "ID4".

Thereafter, the calendar modifying section 557 reads out the calendar template 20 correlated to the terminal unit 400 that transmitted the calendar modifying request on the basis of the terminal-specific information received in the Step S304 (Step S306). Then, the calendar modifying section 557 determines if the pieces of information it recognized in the Step S305 agree with the pieces of information contained in the calendar template 20 that is read out in the Step S306 or not (Step S307).

If the calendar modifying section 557 determines in the Step S307 that the two sets of pieces of information agree with each other, it does not modify the calendar template 20 and terminates the processing operation. If, on the other hand, it determines that the two sets of pieces of information do not agree with each other, it modifies the calendar template 20 on the basis of the various pieces of information it recognized in the Step S305 (Step S308). More specifically, since the classification ID number of the 5th as recognized in the Step S305 is "ID4" and the classification ID number of the 5th as recognized from the calendar template 20 is "ID1", the calendar modifying section 557 modifies the classification ID number of the 5th from "ID1" to "ID4", as shown in FIG. 8. Then, the calendar modifying section 557 stores the calendar template 20, in which the classification ID number is modified, in the storage section 540, correlating it to the terminal unit 400 that transmitted the calendar modifying request, and terminates the processing operation.

(Process of Searching for the Traveling Route)

Now, the process of searching for the traveling route of the navigation system 200 will be described by referring to FIG. 17. FIG. 17 is a flow chart of the operation of searching for a traveling route.

Firstly, the user operates the terminal input section 130 to input a command for searching the traveling route of the vehicle as shown in FIG. 17. As the processor 430 recognizes the input of the command for searching the traveling route of the vehicle (Step S401), the processor 430 causes the terminal display 140 to display an image prompting the user to enter various pieces of information necessary for searching the traveling route such as the destination, the shortest traveling distance, the shortest traveling time and the necessity of predicting traffic jams.

Then, as the processor 430 recognizes the various pieces of information necessary for searching the traveling route, it has the current position recognizer 181 recognize the current position of the vehicle (Step S402) and the destination recognizer 182 recognize the specified and input destination (Step S403). Further, the processor 430 acquires the information on the selected items (Step S404). The information on the current position, the destination and the selected items are appropriately stored in the memory 420.

Thereafter, the processor 430 controls the transceiver 410 and has it transmit the information on the current position, the destination and the selected items stored in the memory 420 to the server 500 along with the signal requesting the server 500 to search the traveling route. When transmitting the various pieces of information, the processor 430 also transmits the terminal-specific information necessary for identifying the terminal unit 400 in question (Step S405).

As the server 500 receives the various pieces of information transmitted from the terminal unit 400 (Step S406), it has the route processor 555 of the CPU 550 determine if the information on the selected items it receives contains a request for prediction of traffic jams or not (Step S407).

If the CPU 550 determines in the Step S407 by the route processor 555 that no request for prediction of traffic jams is contained, it acquires VICS data by the VICS data acquirer 552. Then, the CPU 550 has the traffic jam condition recognizer 553 to generate current traffic jam information of an area containing the current position and the destination from the obtained VICS data. Thereafter, the CPU 550 has the route processor 555 perform a route searching processing operation of searching for the traveling route from the current position of the vehicle to the destination on the basis of the information on the current position, the destination, the selected items and the current traffic jam condition (Step S408).

More specifically, the route processor 555 generates traveling route information on a certain number of, five for instance, candidate traveling routes that meets the requirements of the user, using the map information stored in the storage section 540. It Further generates traveling time information by determining the traveling time that needs to be spent before getting to the destination for each of the candidate traveling routes.

If, on the other hand, the route processor 555 determines in the Step S407 that a request for prediction of traffic jams is contained, it acquires the clock time from the timer 558 and recognizes the current date from the acquired clock time. Then, the CPU 550 has the traffic jam condition recognizer 553 read out the calendar template 20 that is correlated to the terminal unit 400 that requests for searching the traveling route from the storage section 540 on the basis of the terminal-specific information received in the Step S406, thereafter, it retrieves and recognizes the classification ID number of the recognized date from the read out calendar template 20 (Step S409). Further, it recognizes the current position and the destination of the vehicle from the information on the current position and the destination received in the Step S406. Then, the traffic jam condition recognizer 553 retrieves and acquires the time series data 12i that corresponds to the recognized classification ID number and contains the current position and the destination from the traffic jam prediction table 10 stored in the storage section 540 (Step S410).

Thereafter, the CPU 550 performs the processing operation of the Step S408. More specifically, the CPU 550 generates current traffic jam information by the traffic jam condition recognizer 553. Then, the CPU 550 has the route processor 555 to detect a plurality of candidate traveling routes on the basis of the acquired information on the current position, the destination, the selected item and the current traffic jam condition and narrow them down to a fewer number of candidate traveling routes on the basis of the acquired information on the selected items to generate information on the candidate traveling routes that meets the requirements of the user.

Then, the CPU 550 has the traffic jam condition recognizer 553 to acquire the current time and day from the timer 558. Then, the traffic jam condition recognizer 553 determines the expected arrival time of getting to a selected point on each of the candidate traveling routes contained in the information on the candidate traveling routes generated by the route processor 555 on the basis of the current traffic jam information and the current time and day it acquires. Then, the traffic jam condition recognizer 553 predicts the traffic jam on each of the candidate traveling routes at the expected arrival time of getting to the selected point on the basis of the time series data 12i acquired in the Step S410 and generates traffic jam prediction information on the condition of each of the predicted traffic jams.

Then, the CPU 550 narrows down the candidate traveling routes in the candidate traveling route information to a fewer number of candidate traveling routes by the route processor 555 on the basis of the current traffic jam information and the traffic jam prediction information to generate traveling route information on a number of, five for instance, candidate traveling routes that meet the requirements of the user. Further, the route processor 555 determines the traveling time necessary for getting to the destination by each of the candidate traveling routes in the traveling route information to generate traveling time information.

Thereafter, based on the terminal-specific information received in the Step S406, the server 500 controls the interface 510 to appropriately transmit the traveling route information, the traffic jam prediction information, the traveling time information and the current traffic jam information obtained as a result of the route searching processing operation to the terminal unit 400 along with map information (Step S411). It may acquire the matching data MM in advance on the basis of the information on the current position. When transmitting the map information, it is sufficient for the server 500 to transmit the matching mesh information MMx of the matching data MM that contain the nodes N and the links L for the roads of the traveling routes, the display mesh information VMx of the display data VM for other areas, the name information VMxA in the area that corresponds to the matching mesh information MMx and the background information VMxC.

As the processor 430 of the terminal unit 400 receives the various pieces of information (Step S412), it performs coordinate matching processing operations for the received matching data MM (Step S413) and recognizes the road conditions, or the conditions on the connections of the roads, which are then appropriately stored in the memory 420. Further, the processor 430 operates the display controller 184 so as to have the terminal display 140 to display the traveling route information, which is computed by the server 500, concerning the traveling routes of five candidate traveling routes, for example, and an image prompting the user to select one of the candidate traveling routes. The traveling route is defined when the user selects one of the candidate traveling routes.

Thereafter, the processor 430 controls the terminal display 140 by the display controller 184 so as to have it superimpose an icon that indicates the current position of the vehicle on the acquired map information on the basis of the information on the current position and also the traveling route selected by the user the traffic jam prediction information, the expected traveling time and the current traffic jam information. For example, assume here that, by the traffic jam condition recognizer 553 of the server 500, no traffic jam takes place currently on the roads that connect the current position S1 and the destination G with the shortest distance, while no traffic jam is predicted at any point on the traveling route for getting to the destination G. In such a situation, various pieces of information as described above by referring to the first embodiment are superimposed as shown in FIG. 10A.

Subsequently, the processor 430 recognizes the running condition of the vehicle on the basis of the various data output from the sensor 110. Further, the processor 430 notifies the user of guidance information for guiding the travel of the vehicle on the basis of the recognized moving condition of the vehicle and the route guidance information contained in the traveling route information (Step S414). The guidance information is provided to the user by way of the terminal display and/or in voice.

Thereafter, the server 500 acquires VICS data by way of the VICS data acquirer 552. Then, if the moving condition of the vehicle can be influenced and the user can be forced to alter the traveling route according to the VICS data acquired by way of the VICS data acquirer 552, the CPU 550 generates information for confirming a rerouting operation for the purpose of confirming if the route searching operation needs to be repeated or not. Then, it controls the interface 510 to transmit the information for confirming a rerouting operation to the terminal unit 400 in question on the basis of the terminal-specific information received in the Step S406.

Upon receiving the information for confirming a rerouting operation, the processor 430 of the terminal unit 400 that receives the information has the display controller 184 display an image for prompting the user to decide if he or she wants to repeat the route searching operation or not and input the decision along with information on the destination and the selected items on the terminal display 140. Thereafter, upon recognizing the input for the decision of the user on repeating the route searching operation or not and the information on the destination and selected items, the processor 430 generates a rerouting request information containing the information it recognizes. Then, the processor 430 controls the transceiver 410 to transmit the rerouting request information and the terminal-specific information to the server 500.

Upon receiving the various pieces of information transmitted from the terminal unit 400, the server 500 recognizes if the route searching operation is to be repeated or not on the basis of the rerouting request information it receives. It does not perform any processing operation when it recognizes that the route searching operation does not need to be repeated. When, on the other hand, it recognizes that the route searching operation needs to be repeated, the CPU 550 repeats the route searching operation from the Step S407 to the Step S411 in response to the rerouting request. Then, the server 500 controls the interface 510 according to the terminal-specific information it receives and transmits the various pieces of information obtained as a result of the repeated route searching operation along, if necessary, with map information, to the terminal unit 400 in question.

As the processor 430 of the terminal unit 400 receives the various pieces of information from the server 500, it performs the processing operation of the Step S412 and that of the Step S413. If it is recognized by the traffic jam condition recognizer 553 of the server 500 that a traffic jam takes place on the road R12 but it is predicted that no traffic jam will take place at any selected point on the route to the destination G, various pieces of information as shown in FIG. 10B are superimposed on the map being displayed as in the case of the first embodiment.

Assume now that subsequently the server 500 repeats the route searching operation in response to the information requesting a rerouting operation from the terminal unit 400 and the terminal unit 400 receives the various pieces of information obtained as a result of repeating the route searching operation and that if the traffic jam condition recognizer 553 recognizes that the traffic jam on the road R12 is not dissolved yet and one or more than one traffic jams will take place on the road R13 to the destination G, then various pieces of information are superimposed on the map being displayed as shown in FIG. 10C in the first embodiment.

Advantages of the Second Embodiment

As described above in detail, a traffic jam prediction table 10 that contains a plurality of records, each including date classification IDs 11 indicating the classifications of dates and days of the week and time series data 12$i$ relating to traffic conditions and obtained by statistically processing VICS data for any day of the week and any date in the past that can be identified by a date classification ID for every 10 minutes is stored in the storage section 540 of the server 500 of the navigation system 200. Further, the storage section 540 stores calendar templates 20, each of which contains a plurality of records, each indicating dates information showing dates and classification ID numbers, each of which is same as one of the date classification IDs 11 in the traffic jam prediction table 10 and shows the date classification of any of the dates. Then, the server 500 drives the calendar modifying section 557 to appropriately modify the classification ID number of any selected date of any of the calendar templates 20. Further, when the server 500 acquires any selected time series data 12$i$ by the traffic jam condition recognizer 553, it retrieves the classification ID number of the recognized date from the related calendar template 20 and recognizes it. Then, it retrieves the date classification ID number 11 same as the classification ID number it recognizes from the traffic jam prediction table 10 and acquires the time series data 12$i$ of a selected date from the record of the date classification ID number 11.

In this way, the server 500 of the navigation system 200 drives the calendar modifying section 557 to appropriately modify the classification ID number of a selected date of the calendar template 20 to be used for acquiring the time series data 12*i* by the traffic jam condition recognizer 553. Thus, it is possible to appropriately and easily modify the time series data 12*i* correlated to a selected date with the simple arrangement of modifying only the classification ID number of the selected date of the calendar template 20. Since the date information and the classification ID numbers of the calendar template 20 generally involve only a small amount of data if compared with the time series data 12*i*, the operation of modifying the calendar template 20 is easy. Therefore, it is possible to provide the navigation system 200 that can easily and appropriately utilize traffic information on past traffic conditions. Further, the arrangement and the process for conveniently utilizing traffic information can be simplified because the time series data 12*i* are acquired by using the calendar template 20 that contains the date information and classification ID numbers that involve only a small amount of data. Furthermore, since the storage section 540 of the server 500 stores the traffic jam prediction table 10 that involves a large amount of data, it is possible to reduce the memory capacity of the memory 420 of each of the terminal units 400. In other words, the terminal units 400 can be made to have a simple configuration.

The server 500 is provided with a plurality of calendar templates 20 that contain the dates of a year like a calendar. With the use of calendar templates 20, classification ID numbers can be allocated to the dates of a year without difficulty. With this arrangement, any of the calendar templates 20 can be modified by a simple operation.

The server 500 is provided with a timer 558 that tells the current time and date. As the server 500 recognizes a traffic jam prediction request, requesting acquisition of traffic conditions of a selected date in the past, it drives the traffic jam condition recognizer 553 to recognize the current date from the timer 558. Then, it retrieves and identifies the record of the date it recognizes from the related calendar template 20 and then recognizes the classification ID number of the date from the identified record. Subsequently, the traffic jam condition recognizer 553 retrieves and identifies the record having the date classification ID 11 same as that of the classification ID number it recognizes from the traffic jam prediction table 10 stored in the storage section 540 and acquires the time series data 12*i*, which include information on past traffic conditions from the identified record.

As described above, when acquiring the time series data 12*i* of a selected date, the server 500 recognizes the current date from the timer 558 and acquires the time series data 12*i* from the traffic jam prediction table 10 on the basis of the date it recognizes. Therefore, it is not necessary to take in the information on the current date into the traffic jam prediction request and hence the traffic jam prediction request can be generated with ease.

The time series data 12*i* are data relating to past traffic conditions of a selected location. As the server 500 recognizes a traffic jam prediction request, it drives the traffic jam condition recognizer 553 to acquire information on the current position and the destination and then recognizes the current position and the destination from the acquired pieces of information. Thereafter, it retrieves and acquires the time series data 12*i* that are correlated to the current date and provide information on the geographical area that includes the current position and the destination.

Since the time series data 12*i* are data relating to past traffic conditions of a selected location, it is possible to reduce the volume of information of each set of time series data 12*i*. Further, since the server 500 recognizes the current position and the destination and acquires the time series data 12*i* of the geographical area that includes the current position and the destination, the information to be acquired can be minimized. Therefore, it is possible to carry out the process of acquiring the time series data 12*i* easily and quickly. Further, since the volume of time series data 12*i* to be transmitted to the related terminal unit 400 can be reduced, transmission and reception of the time series data 12*i* can be realized very quickly.

The traffic jam prediction table 10 contains time series data 12*i* relating to past traffic conditions of a specific date. In other words, the terminal units 400 can acquire information on traffic conditions in the past of a specific date that is not defined simply by a day of the week and a calendar date and hence the navigation system 200 can find a broad scope of application.

The traffic jam prediction table 10 contains time series data 12*i* relating to the dates when festivals and sports events were held in the past and also to the day before, the first day, the middle day, the last day and the day before the last day of a long holiday that is longer than three consecutive days. Thus, it is possible for the terminal units 400 to acquire information on past traffic conditions of on each of such days when the traffic condition can be different from that of ordinary days. Therefore, the navigation system 200 can find a broad scope of application.

The traffic jam condition recognizer 553 is provided with a functional feature of generating traffic jam prediction information on the traffic jams that take place at locations on the way to the destination by using the acquired time series data 12*i*. Therefore, the navigation system 200 can predict any traffic jams that take place on the way along which the vehicle is traveling. Therefore, the navigation system 200 can find a broad scope of application. Further, it predicts traffic jams by using the time series data 12*i* on past traffic conditions on any day of the week and on any calendar date. Thus, the navigation system 200 can provide highly reliable traffic jam prediction information.

Further, the traffic jam condition recognizer 553 generates traffic jam prediction information on the basis of the clock time provided by the timer 558 arranged in the server 500. Therefore, the traffic jam prediction information is highly reliable in terms of clock time. Thus, the navigation system 200 can provide highly reliable traffic jam prediction information.

The server 500 has a route processor 555 and an interface 510. The route processor 555 searches for the traveling route on the basis of information on the current position and information on the destination it acquires from the related terminal unit 400 and information on the traffic predictions generated by the traffic jam condition recognizer 553 on the basis of the time series data 12*i* and generates information on the searched traveling route. The interface 510 transmits the traveling route information generated by the route processor 555 to the terminal unit 400. Then, the terminal unit 400 receives the traveling route information transmitted from the server 500 and makes the terminal display 140 display the received traveling route in order to notify the traveling route to the user.

More specifically, the server 500 drives the route processor 555 to search for the traveling route, taking the generated traffic jam predictions into consideration, and the terminal unit 400 notifies the user of the traveling route by the terminal display 140. Therefore, the navigation system 200 can notify the most appropriate traveling route that meets the requirements of the user, which may include the minimum traveling time and/or the minimum traveling distance. Thus, the navigation system 200 can find a broad scope of application.

The server 500 has a storage section 540 for storing calendar templates 20. The calendar modifying section 557 has a function of acquiring information on a date and an event and a function of recognizing a classification ID number from the acquired event information. Then, the server 500 drives the calendar modifying section 557 to identify the record of the calendar template 20 stored in the storage section 540 on the basis of the acquired date information and modifies the classification ID number of the identified record to the recognized classification ID number.

As the server 500 has the storage section 540 that stores calendar templates 20, it can quickly identify the record of a calendar template 20 by the calendar modifying section 557. Then, it can quickly modify the calendar template 20. Further, the storage section 540 of the server 500 stores calendar templates 20, the memory 420 of each of the terminal units 400 can be reduced to simplify the configuration of the terminal units 400.

When modifying the classification ID number of a selected date of a calendar template 20, the calendar modifying section 557 determines if the classification ID number of the record of the calendar template 20 identified from the date information of the calendar modifying request and the classification ID number recognized from the event information of the calendar modifying request agree with each other or not. If it is determined that the two classification ID numbers do not agree with each other, the calendar modifying section 557 modifies the classification ID number of the record of the calendar template 20 identified from the date information of the calendar modifying request to the classification ID number recognized from the event information of the calendar modifying request. If, on the other hand, it is determined that the two classification ID numbers agree with each other, the calendar modifying section 557 does not modify the classification ID number of the record of the calendar template 20.

With this arrangement, it is possible to reduce the number of times of processing operations by one when the classification ID number of the record of the calendar template 20 identified from the date information of the calendar modifying request and the classification ID number recognized from the event information of the calendar modifying request agree with each other. Therefore, the operation of modifying the calendar template 20 can be performed appropriately and quickly.

Each of the terminal units 400 includes a terminal input section 130 and a processor 430 by which the user can generate a calendar modification request containing date information and/or an event information and transmit it to the server 500. The calendar modifying section 557 of the server 500 acquires the calendar modification request from the terminal unit 400 and recognizes the classification ID number of the event information included in the calendar modification request it acquires. Then, it retrieves and identifies the record of the date as identified by the date information of the calendar modifying request from the calendar template 20 and modifies the classification ID number of the identified record to the classification ID number recognized from the event information of the calendar modifying request.

In this way, the classification ID number of any date of the calendar templates 20 can be modified as a calendar modification request is generated by any of the terminal units 400 and the generated calendar modification request is transmitted to the server 500. Thus, if the user recognizes event information that is not reflected to the calendar templates 20 from radio or television broadcasting, he or she can modify the classification ID number of the related calendar template 20 of the server 500 simply by operating his or her terminal unit 400 to generate a calendar modification request and transmitting it to the server 500. Then, the server 500 can appropriately acquire information on the past traffic conditions to which the event is responsible from the calendar template 20 in which the classification ID number is modified, and transmits it to the terminal unit 400. Therefore, the navigation system 200 can appropriately acquire information on the past traffic conditions of any selected date.

Modifications to the Embodiments

The present invention is by no means limited to the above-described embodiments, which may be modified and altered without departing from the scope of the present invention.

While each date classification ID of the traffic jam prediction table 10 is correlated to a plurality of time series data 12$i$ in the above description, such correlation does not necessarily need to be established and a date classification ID may be correlated to single time series data 12$i$ in an arbitrarily selected large geographical area. With this arrangement, the number of time series data 12$i$ contained in the traffic jam prediction table 10 can be reduced so that it is possible to carry out the operation of retrieving and acquiring time series data 12$i$ easily and quickly.

While the traffic jam prediction table 10 incorporates time series data 12$i$ for special days including days when various events are held and days relating to a long holiday as well as days immediately before and after a long holiday in the above description, the traffic jam prediction table 10 may have a different arrangement. For example, it may alternatively be so arranged that the traffic jam prediction table 10 incorporates time series data 12$i$ not for special days but for calendar dates such as "workdays", "Saturdays" and "Sundays and holidays". Still alternatively, it may be so arranged that traffic jam prediction table 10 incorporates only time series data 12$i$ for the special days. With any of the above-described alternative arrangements, it is possible to reduce the number of time series data 12$i$ contained in the traffic jam prediction table 10 and retrieve and acquire time series data 12$i$ easily and quickly. Further, it is possible to reduce the storage capacity of each of the storages 160 and 540 for storing the traffic jam prediction table 10.

For example, in the first embodiment, the traffic jam condition recognizer 187 recognizes the current date from the clock time information acquired from the timer 191 and acquires the time series data 12$i$ correlated to the recognized date. However, it may not necessarily be so and the first embodiment may alternatively be so arranged that the traffic jam prediction request includes date information and the traffic jam condition recognizer 187 acquires the time series data 12$i$ correlated to the date information included in the traffic jam prediction request and generates a traffic jam prediction, using the acquired time series data 12$i$. Still alternatively, the second embodiment may be made to have a configuration similar to that of the first embodiment. More specifically, each of the terminal units 400 generates a traffic jam prediction request that includes date information and transmits it to the server 500. Then, the server 500 acquires the time series data 12$i$ correlated to the date information included in the traffic jam prediction request received from the terminal unit 400 and generates a traffic jam prediction, using the acquired time series data 12$i$.

With this arrangement, once a date in the future is specified, the route processor 188 or 555 can search for the traveling route on the basis of the traffic jam prediction generated by the traffic jam condition recognizer 187 or 553, whichever appropriate, taking the traffic jam condition prediction of the date in the future into consideration. Then, the navigation device 100 and the navigation system 200 can appropriately notify the traveling route on the specified date in the future to the user. Such a navigation device 100 and a navigation system 200 can find a broad scope of application.

Further, the traffic jam prediction request may include date information indicating a date in the past. Then, the traffic jam condition recognizer 187 or 553 generates a traffic jam prediction, using the time series data 12*i* correlated to the date information included in the traffic jam prediction request and the current position information indicating the position of the vehicle on the date in the past that is stored separately. With this arrangement, it is possible for the route processor 188 or 555 to search the traveling route on the basis of the traffic jam prediction generated by the traffic jam condition recognizer 187, 553, whichever appropriate, taking the traffic jam condition prediction for the traveling route that is taken when the user traveled on the date in the past into consideration. Then, it is possible to display the traveling route in the past like a photograph album. Such a navigation device 100 and navigation system 200 can find a broad scope of application.

For instance, in the first embodiment, any of the calendar templates 20 can be modified on the basis of the date information and the event information selected and input by operating the terminal input section 130. However, the present invention is by no means limited thereto and a navigation device according to the present invention may alternatively be arranged such that the navigation device 100 further includes an event information acquirer for acquiring information on dates and events that may be provided by gazettes issued from the central and local governments and the calendar modifying section 190 may automatically modify the related ones of the calendar templates 20 on the basis of the various pieces of information acquired by the event information acquirer. In the second embodiment, the server 500 may further include such an event information acquirer and the calendar modifying section 557 may automatically modify the related ones of the calendar templates 20 on the basis of the various pieces of information acquired by the event information acquirer.

With such an arrangement, the calendar templates 20 can be made to reliably reflect the information on events that is provided by the central and local governments. Then, the navigation device 100 and the navigation system 200 can appropriately acquire information on the traffic condition of any desired date in the past. Further, it may be so arranged that the user is asked if he or she wants to modify the calendar templates 20 on the basis of the various pieces of information acquired by the event information acquirer. With such an arrangement, the calendar templates 20 can be made to reliably reflect the intention of the user. Such a navigation device 100 and navigation system 200 can find a broad scope of application.

In the first embodiment, when the classification ID number of an appropriately selected date on one of the calendar templates 20 is modified, it is determined if the classification ID number of the record of the related calendar template 20 identified from the selected and input date information and the classification ID number recognized from the selected and input event information agree with each other or not. However, the present invention is by no means limited thereto and a navigation device according to the present invention may alternatively be arranged such that the calendar template 20 is always modified on the basis of the selected and input various pieces of information without involving such a judgment. In the second embodiment, similarly, it may have such an arrangement that does not involve the above-described judgment. With this arrangement, the processing operation of the Step S104 of the first embodiment and that of the Step S307 of the second embodiment can be omitted to allow the entire processing operation of modifying the calendar template 20 to be carried out more quickly.

The navigation device 100 of the first embodiment may be connected to a server that acquires information on dates and events and includes a server transmitter to transmit the acquired various pieces of information to the navigation device 100 through the network and modifies the related ones of the calendar templates 20 by the calendar modifying section 190 on the basis of the various pieces information transmitted from the server.

With this arrangement, it is not necessary to provide the navigation device 100 with the function of generating information on dates and events and hence the navigation device 100 can be made to have a simple configuration. Furthermore, the navigation device 100 may further include a modification request generator that is adapted to makes sure if the related one of the calendar templates 20 is to be modified on the basis of the various pieces of information transmitted from the server or not. With this arrangement, the calendar templates 20 can be made to reflect the intentions of the user. Such a navigation device 100 can find a broad scope of application.

As described above, a moving body is not limited to a vehicle and may alternatively be an aircraft or a ship. When the user carries the terminal unit 400 as a portable device, the current position of the user may be recognized as that of the moving body. Further, as described above, the terminal unit 400 may be a mobile phone or PHS that the user carries and the server 500 may be the base station of the mobile phone or PHS so that the mobile phone or PHS (Personal Handyphone System) acquires information from the base station. In any case, the present invention is most effectively applicable to a moving body to which a traffic jam can be an obstacle against its movement.

Further, the traffic condition is not necessarily limited to traffic jam condition and may include any situations relating to the movement of a moving body.

While retrieval information is retrieved in the above description, it is not necessary to provide such an arrangement.

While the information on the current position to be recognized by the current position recognizer is acquired on the basis of the data output from the various sensors and the GPS data output from the GPS receiver in the above description, any other technique may be used to recognize the current position of a moving body. As described above, the assumed current position input at the terminal input section 130 may alternatively be recognized as the current position.

While many of the functions are realized in the form of programs in the above-description, some of them may be replaced by hardware such as a circuit board and/or some other element such as IC (Integrated Circuit). The market for navigation systems according to the present invention will expand when the programs are readably stored in a separate recording medium for the convenience of handling.

While the transceiver 410 is arranged in the terminal unit 400 in the above description, the transceiver 410 may be separated from the terminal unit 400 and a mobile phone or PHS may be used as the transceiver 410 so that information may be exchanged between the transceiver 410 and the terminal unit 400.

Furthermore, any of the arrangements and the procedures of a device or a system according to the present invention may be modified and altered appropriately without departing from the scope of the present invention.

ADVANTAGES OF THE EMBODIMENTS

As described above in detail, with one embodiment, the traffic jam prediction table 10 that contains a plurality of records, each including date classification IDs 11 indicating the classifications of dates and days of the week and time series data 12i relating to traffic conditions and obtained by statistically processing VICS data for any day of the week and any date in the past for every 10 minutes is stored in the storage section 160 of the navigation device 100. Further, the memory 170 stores the calendar templates 20, each of which contains a plurality of records, each indicating date information showing dates and classification ID numbers, each of which is same as one of the date classification IDs 11 in the traffic jam prediction table 10 and shows the date classification of any of the dates. Then, the navigation device 100 drives the calendar modifying section 190 to appropriately modify the classification ID number of any selected date of any of the calendar templates 20. Further, when the navigation device 100 acquires selected time series data 12i by the traffic jam condition recognizer 187, it retrieves the classification ID number of the recognized date from the related calendar template 20 and recognizes it. Then, it retrieves the date classification ID number 11 same as the classification ID number it recognizes from the traffic jam prediction table 10 and acquires the time series data 12i of a selected date from the record of the date classification ID number 11.

In this way, the navigation device 100 drives the calendar modifying section 190 to appropriately modify the classification ID number of a selected date of the calendar template 20 used for acquiring the time series data 12i by the traffic jam condition recognizer 187. Thus, it is possible to appropriately and easily modify the time series data 12i correlated to a selected date with the simple arrangement of modifying only the classification ID number of the selected date of the calendar template 20. Since the date information and the classification ID numbers of a calendar template 20 generally involve only a small amount of data if compared with the time series data 12i, the operation of modifying the calendar template 20 is easy. Therefore, it is possible to provide a navigation device 100 that can easily and appropriately utilize traffic information on past traffic conditions.

With another embodiment, the traffic jam prediction table 10 that contains a plurality of records, each including date classification IDs 11 indicating the classifications of dates and days of the week and time series data 12i relating to traffic conditions and obtained by statistically processing VICS data for any day of the week and any date in the past for every 10 minutes is stored in the storage section 540 of the server 500 of the navigation system 200. Further, the storage section 540 stores the calendar templates 20, each of which contains a plurality of records, each indicating date information showing dates and classification ID numbers, each of which is same as one of the date classification IDs 11 in the traffic jam prediction table 10 and shows the date classification of any of the dates. Then, the server 500 drives the calendar modifying section 557 to appropriately modify the classification ID number of any selected date of any of the calendar templates 20. Further, when the server 500 acquires selected time series data 12i by the traffic jam condition recognizer 553, it retrieves the classification ID number of the recognized date from the related calendar template 20 and recognizes it. Then, it retrieves the date classification ID number 11 same as the classification ID number it recognizes from the traffic jam prediction table 10 and acquires the time series data 12i of a selected date from the record of the date classification ID number 11.

In this way, the server 500 of the navigation system 200 drives the calendar modifying section 557 to appropriately modify the classification ID number of a selected date of the calendar template 20 used for acquiring the time series data 12i by the traffic jam condition recognizer 553. Thus, it is possible to appropriately and easily modify time series data 12i correlated to a selected date with the simple arrangement of modifying only the classification ID number of the selected date of the calendar template 20. Since the date information and the classification ID numbers of a calendar template 20 generally involve only a small amount of data if compared with the time series data 12i, the operation of modifying the calendar template 20 is an easy one. Therefore, it is possible to provide a navigation system 200 that can easily and appropriately utilize traffic information on past traffic conditions. Further, since the storage section 540 of the server 500 stores the traffic jam prediction table 10 that involves a large amount of data, it is possible to reduce the memory capacity of the memory 420 of each of the terminal units 400. In other words, the terminal units 400 can be made to have a simple configuration.

The invention claimed is:

1. An information processing device for processing statistic traffic information obtained by statistically processing traffic information on past traffic conditions in terms of temporal elements, the statistic traffic information including a plurality of pieces of date classifying information for classifying data for predetermined dates and statistic condition information obtained by statistically processing the traffic conditions on each of the dates correlated to the corresponding one of the plurality of pieces of date classifying information in terms of temporal elements;

the device comprising:

a date classification modifier adapted to modify the plurality of pieces of date classifying information included in data information which is formed as one data structure containing a plurality of pieces of date information indicating the dates and the plurality of pieces of date classifying information that corresponds respectively to the dates indicated by the plurality of pieces of date information.

2. The information processing device according to claim 1, wherein the pieces of date information are provided in a plurality of calendar-like forms that contain the dates of a year.

3. The information processing device according to claim 1, further comprising:

a timer for clocking the current time and date;

a date classification recognizer for acquiring the current time and date from the timer by recognizing an acquisition request signal requesting acquisition of the statistic condition information, identifying the data information on the basis of the date indicated by the acquired current time and date and recognizing the date classifying information from the data information; and a condition information acquirer for identifying the statistic traffic information on the basis of the date classifying information recognized by the date classification recognizer and acquiring the statistic condition information of the identified statistic traffic information.

4. The information processing device according to claim 3, wherein
the statistic condition information includes a plurality of pieces of place-specific statistic traffic information obtained by statistically processing the traffic condition at an arbitrary place on the date in terms of temporal elements; and
the date classification recognizer recognizes place-identifying information for identifying the arbitrary place with the acquisition request signal, while
the condition information acquirer retrieves and acquires the place-specific statistic traffic information corresponding to the place-identifying information recognized by the date classification recognizer from the identified statistic traffic information.

5. The information processing device according to claims 3, wherein
the statistic traffic information is information obtained by statistically processing past traffic conditions on a special date in terms of temporal elements.

6. The device according to claim 5, wherein
the special date is at least a date when an event is held, the immediately preceding day of the date when an event is held, one of three or more than three consecutive holidays or the immediately preceding day of such consecutive holidays.

7. The information processing device according to claims 3, further comprising:
a traffic condition predictor for predicting the traffic condition in the future from the statistic condition information acquired by the condition information acquirer.

8. The information processing device according to claim 1, further comprising:
a date classification recognizer for identifying the data information on the basis of the date information by recognizing an acquisition request signal requesting acquisition of the statistic condition information correlated to the date information and recognizing the date classifying information from the identified data information; and
a condition information acquirer for identifying the statistic traffic information on the basis of the date classifying information recognized by the date classification recognizer and acquiring the statistic condition information of the identified statistic traffic information.

9. The information processing device according to claims 1, further comprising:
a positional information acquirer for acquiring positional information on the current position and the destination of a moving body;
a route searcher for searching the traveling route of the moving body on the basis of the positional information acquired by the statistic condition information and the positional information acquirer; And
a notification control section for notifying the traveling route searched by the route searcher to a notifying section.

10. The information processing device according to claims 1, further comprising:

a storage section for storing the data; and
a modification information acquirer for acquiring the date classifying information correlated to the date information and the date indicated by the date information;
the date classification modifier being adapted to identify the data information by retrieving the date information acquired from the storage section by the modification information acquirer and modify the date classifying information of the identified data information to the date classifying information acquired by the modification information acquirer.

11. The information processing device according to claim 10, wherein
the date classification modifier identifies the data information by retrieving the date information acquired from the storage section by the modification information acquirer, determines if the date classifying information of the identified data information and the date classifying information acquired by the modification information acquirer agree with each other or not and, if it determines that they agree with each other, modifies the date classifying information of the identified data information to the date classifying information acquired by the modification information acquirer.

12. The information processing device according to claim 10, further comprising:
a modification information generator for generating the date classifying information correlated to the date information and the date indicated by the date information and outputting it;
the modification information acquirer being adapted to acquire the date information and the date classifying information from the modification information generator.

13. An information processing system comprising:
an information processing device for processing statistic traffic information obtained by statistically processing traffic information on past traffic conditions in terms of temporal elements,
the statistic traffic information including a plurality of pieces of date classifying information for classifying data for predetermined dates and statistic condition information obtained by statistically processing the traffic conditions on each of the dates correlated to the corresponding one of the plurality of pieces of date classifying information in terms of temporal elements;
the device further comprising:
a date classification modifier adapted to modify the plurality of pieces of date classifying information included in data information which is formed as one data structure containing a plurality of pieces of date information indicating the dates and the plurality of pieces of date classifying information that corresponds respectively to the dates indicated by the plurality of pieces of date information; and
a terminal unit connected to the information processing device via a network so as to be able to exchange various pieces of information and having a request information generator for generating a modification request information requesting to modify the date classifying information of the data information and transmitting it to the information processing device;
the date classification modifier being adapted to modify the date classifying information of the data information upon recognizing the reception of the modification request information transmitted from the terminal unit.

14. An information processing system comprising an information processing device and a terminal unit, wherein:
the information processing device is for processing statistic traffic information obtained by statistically processing traffic information on past traffic conditions in terms of temporal elements,
the statistic traffic information including a plurality of pieces of date classifying information for classifying data for predetermined dates and statistic condition information obtained by statistically processing the traffic conditions on each of the dates correlated to the corresponding one of the plurality of pieces of date classifying information in terms of temporal elements;
the device comprising:
a date classification modifier adapted to modify the plurality of pieces of date classifying information included in data information which is formed as one data structure containing a plurality of pieces of date information indicating the dates and the plurality of pieces of date classifying information that corresponds respectively to the dates indicated by the plurality of pieces of date information;
the device further comprising:
a storage section for storing the data; and
a modification information acquirer for acquiring the date classifying information correlated to the date information and the date indicated by the date information;
the date classification modifier being adapted to identify the data information by retrieving the date information acquired from the storage section by the modification information acquirer and modify the date classifying information of the identified data information to the date classifying information acquired by the modification information acquirer;
and wherein:
the terminal unit is connected to the information processing device via a network so as to be able to exchange various pieces of information and has a terminal modification information generator for generating date information and date classifying information and transmits them to the information processing device;
the modification information acquirer being adapted to acquire the date information and the date classifying information transmitted from the terminal unit.

15. An information processing system comprising an information processing device and a server,
wherein:
the information processing device is for processing statistic traffic information obtained by statistically processing traffic information on past traffic conditions in terms of temporal elements,
the statistic traffic information including a plurality of pieces of date classifying information for classifying data for predetermined dates and statistic condition information obtained by statistically processing the traffic conditions on each of the dates correlated to the corresponding one of the plurality of pieces of date classifying information in terms of temporal elements;
the device comprising:
a date classification modifier adapted to modify the plurality of pieces of date classifying information included in data information which is formed as one data structure containing a plurality of pieces of date information indicating the dates and the plurality of pieces of date classifying information that corresponds respectively to the dates indicated by the plurality of pieces of date information;
the device further comprising:
a storage section for storing the data; and
a modification information acquirer for acquiring the date classifying information correlated to the date information and the date indicated by the date information;
the date classification modifier being adapted to identify the data information by retrieving the date information acquired from the storage section by the modification information acquirer and modify the date classifying information of the identified data information to the date classifying information acquired by the modification information acquirer;
and wherein:
the server is connected to the information processing device via a network so as to be able to exchange various pieces of information and has a server transmitter for acquiring date information and date classifying information and transmits them to the information processing device;
the modification information acquirer being adapted to acquire the date information and the date classifying information transmitted from the server.

16. An information processing method for processing statistic traffic information obtained by statistically processing traffic information on past traffic conditions in terms of temporal elements,
the statistic traffic information including a plurality of pieces of date classifying information for classifying data for predetermined dates and statistic condition information obtained by statistically processing the statistic conditions on each of the dates correlated to the corresponding one of the plurality of pieces of date classifying information in terms of temporal elements;
the method comprising:
modifying a plurality of pieces of date classifying information included in data information which is formed as one data structure containing a plurality of pieces of date information indicating the dates and the plurality of pieces of date classifying information that corresponds respectively to the dates indicated by the plurality of pieces of date information.

17. An information processing program for having a computer to execute an information processing method, in which the method is:
an information processing method for processing statistic traffic information obtained by statistically processing traffic information on past traffic conditions in terms of temporal elements,
the statistic traffic information including a plurality of pieces of date classifying information for classifying data for predetermined dates and statistic condition information obtained by statistically processing the statistic conditions on each of the dates correlated to the corresponding one of the plurality of pieces of date classifying information in terms of temporal elements;
the method comprising:
modifying a plurality of pieces of date classifying information included in data information which is formed as one data structure containing a plurality of pieces of date information indicating the dates and the plurality of pieces of date classifying information that corresponds respectively to the dates indicated by the plurality of pieces of date information.

18. A recording medium computing-device-readably storing an information processing program for having a computer to execute an information processing method, in which the method is:

an information processing method for processing statistic traffic information obtained by statistically processing traffic information on past traffic conditions in terms of temporal elements, the statistic traffic information including a plurality of pieces of date classifying information for classifying data for predetermined dates and statistic condition information obtained by statistically processing the statistic conditions on each of the dates correlated to the corresponding one of the plurality of pieces of date classifying information in terms of temporal elements;

the method comprising:

modifying a plurality of pieces of date classifying information included in data information which is formed as one data structure containing a plurality of pieces of date information indicating the dates and the plurality of pieces of date classifying information that corresponds respectively to the dates indicated by the plurality of pieces of date information.

* * * * *